(12) United States Patent
Tomeba et al.

(10) Patent No.: US 9,077,599 B2
(45) Date of Patent: Jul. 7, 2015

(54) PRECODING APPARATUS, PROGRAM FOR PRECODING, AND INTEGRATED CIRCUIT

(75) Inventors: Hiromichi Tomeba, Osaka (JP); Takashi Onodera, Osaka (JP); Hiroshi Nakano, Osaka (JP); Alvaro Ruiz Delgado, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/236,125
(22) PCT Filed: Jul. 20, 2012
(86) PCT No.: PCT/JP2012/068488
§ 371 (c)(1),
(2), (4) Date: Jan. 30, 2014
(87) PCT Pub. No.: WO2013/021803
PCT Pub. Date: Feb. 14, 2013

(65) Prior Publication Data
US 2014/0177751 A1 Jun. 26, 2014

(30) Foreign Application Priority Data
Aug. 5, 2011 (JP) ................. 2011-172228

(51) Int. Cl.
H04L 27/00 (2006.01)
H04L 27/26 (2006.01)
(Continued)

(52) U.S. Cl.
CPC .......... *H04L 27/2626* (2013.01); *H04B 7/0456* (2013.01); *H04B 7/0617* (2013.01); *H04L 1/00* (2013.01)

(58) Field of Classification Search
CPC .. H04B 7/0456; H04B 7/0452; H04B 7/0617; H04B 7/0413; H04B 7/0632; H04L 1/00; H04L 27/00; H04L 27/2626; H04L 1/0003; H04L 2025/03414; H04L 2025/03426; H04L 25/0204; H04L 25/0242; H04L 25/033
USPC .................. 375/299, 295, 259, 260
See application file for complete search history.

(56) References Cited

U.S. PATENT DOCUMENTS 7,672,408 B2  3/2010  Higuchi et al.
8,619,892 B2 *  12/2013  Vetter et al. .................. 375/267
(Continued)

FOREIGN PATENT DOCUMENTS

JP  2005-354678 A  12/2005

OTHER PUBLICATIONS

Hochwald et al., "A Vector-Perturbation Technique for Near-Capacity Multiantenna Multiuser Communication—Part II: Perturbation," IEEE Transactions on Communications, vol. 53, No. 3, Mar. 2005, pp. 537-544.
(Continued)

*Primary Examiner* — Kenneth Lam
(74) *Attorney, Agent, or Firm* — Keating & Bennett, LLP

(57) ABSTRACT

More reduction of the amount of operation than in QRM-VP is realized while maintaining transmission performance that can be achieved by VP. A precoding apparatus 109 that performs preliminary processing on transmission data transmitted from a wireless transmission apparatus including a plurality of antennas to a wireless reception apparatus includes a linear filter generation section 301 that generates a linear filter on the basis of a result of estimation of a channel between an antenna unit 111 and the wireless reception apparatus, a signal conversion section 303 that expands perturbation term candidates of a perturbation vector to be added to a transmission data vector and a reference signal associated with the transmission data in a complex plane, and a perturbation vector search section 305 that searches for the perturbation vector to be added to the transmission data vector by performing a quadrant search on the basis of the perturbation term candidates and the reference signal expanded in the complex plane. A transmission signal vector is calculated by adding a found perturbation vector to the transmission data vector and multiplying the transmission data vector by the linear filter.

14 Claims, 17 Drawing Sheets

(51) Int. Cl.
*H04B 7/04* (2006.01)
*H04B 7/06* (2006.01)
*H04L 1/00* (2006.01)

(56) References Cited

U.S. PATENT DOCUMENTS

| | | | | |
|---|---|---|---|---|
| 2005/0259771 | A1 | 11/2005 | Higuchi et al. | |
| 2008/0247489 | A1* | 10/2008 | Kou et al. | 375/299 |
| 2009/0175375 | A1* | 7/2009 | Zhang | 375/267 |
| 2011/0244816 | A1* | 10/2011 | Mori et al. | 455/101 |
| 2012/0294240 | A1* | 11/2012 | Nakano et al. | 370/328 |
| 2012/0327881 | A1* | 12/2012 | Nakano et al. | 370/329 |
| 2013/0003641 | A1* | 1/2013 | Nakano et al. | 370/312 |
| 2013/0223269 | A1* | 8/2013 | To et al. | 370/252 |
| 2013/0286949 | A1* | 10/2013 | Tomeba et al. | 370/328 |
| 2013/0336282 | A1* | 12/2013 | Nakano et al. | 370/330 |
| 2013/0336418 | A1* | 12/2013 | Tomeba et al. | 375/267 |

OTHER PUBLICATIONS

Mohaisen et al., "Fixed-complexity Vector Perturbation with Block Diagonalization for MU-MIMO Systems," Proc. IEEE Malaysia International Conference on Communication, 2009, 6 pages.
Official Communication issued in International Patent Application No. PCT/JP2012/068488, mailed on Aug. 14, 2012.

* cited by examiner

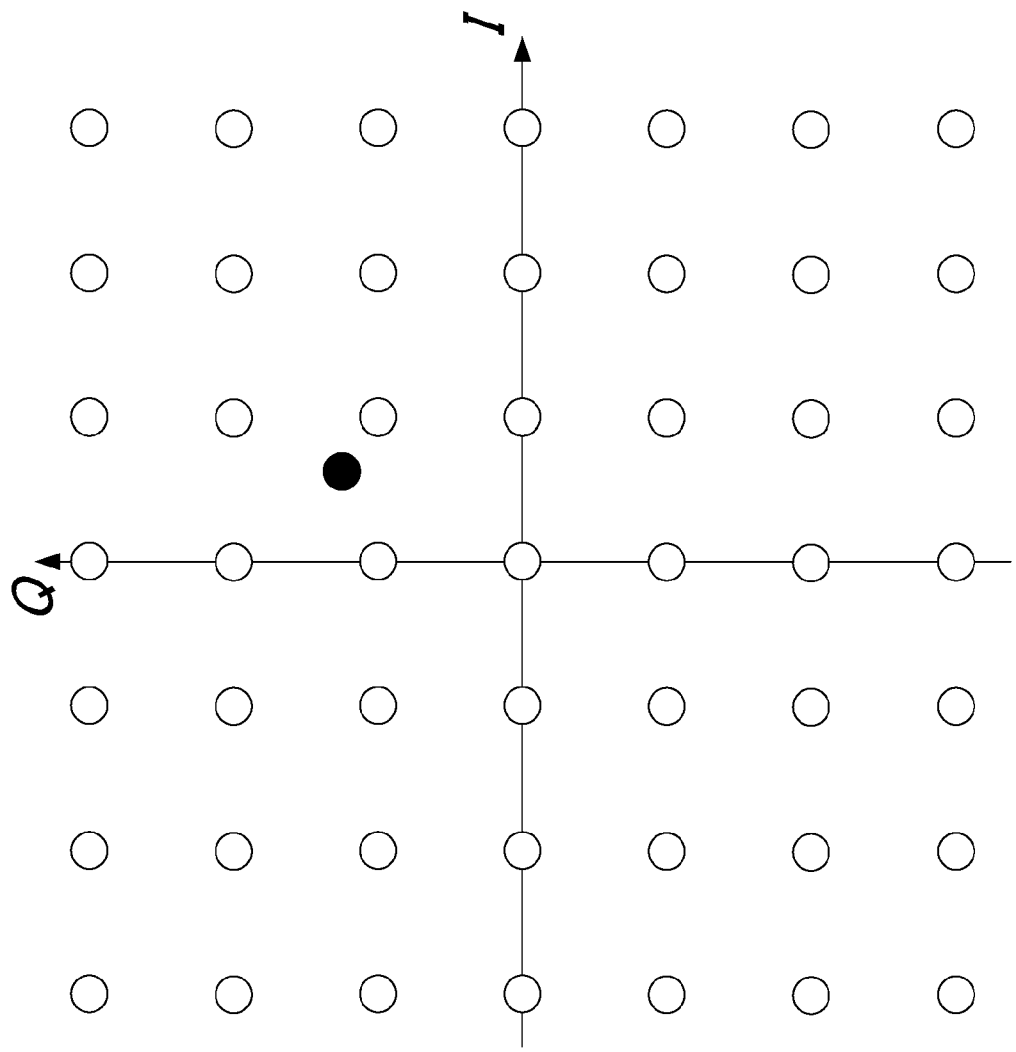

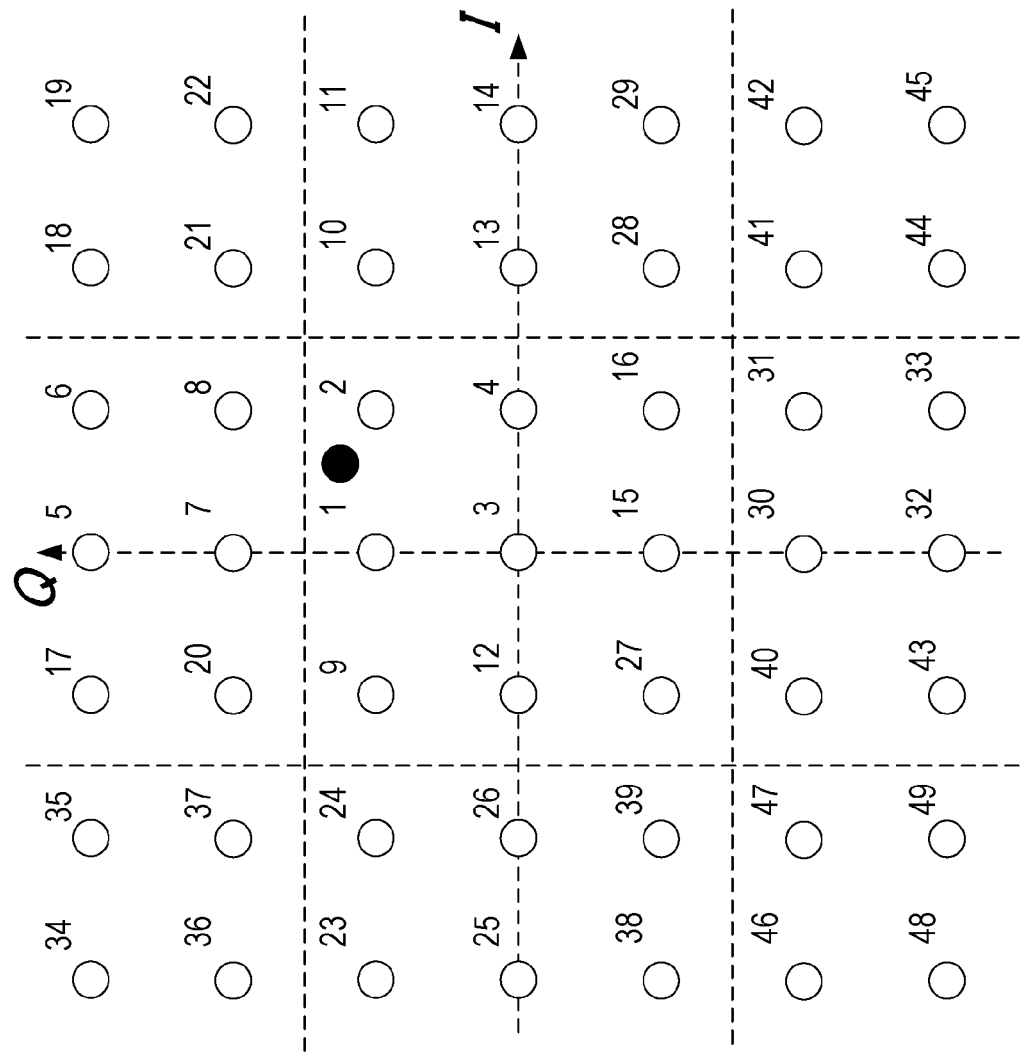

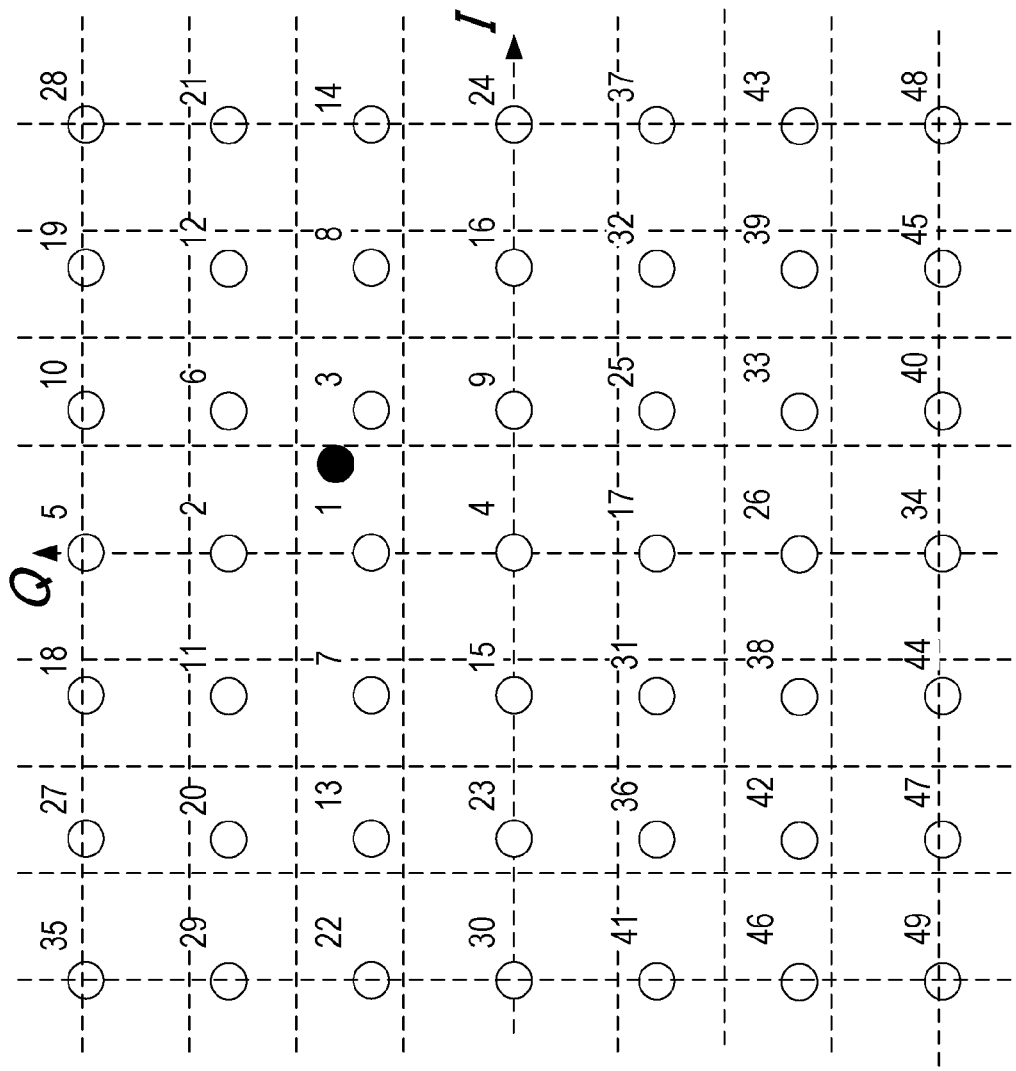

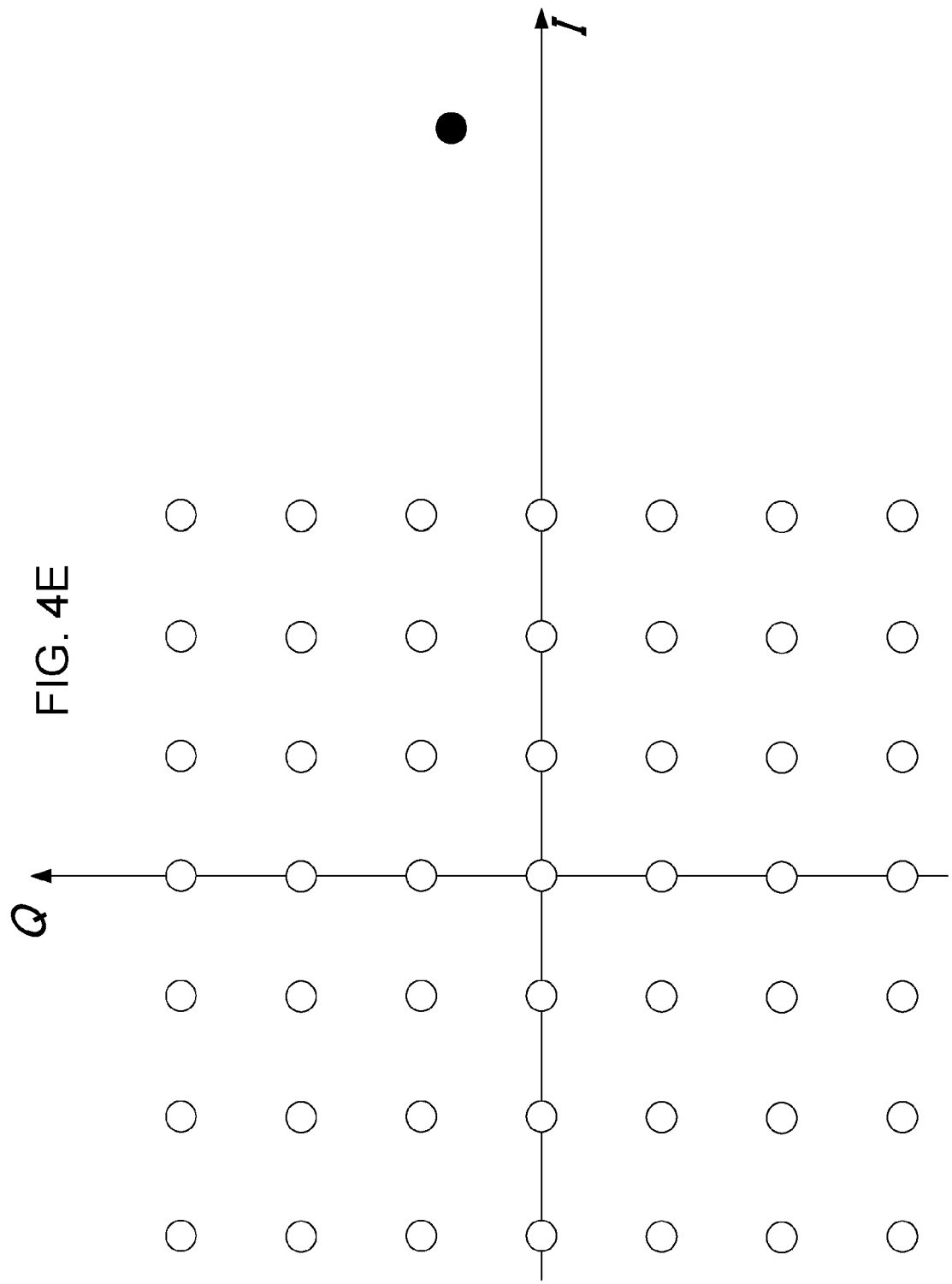

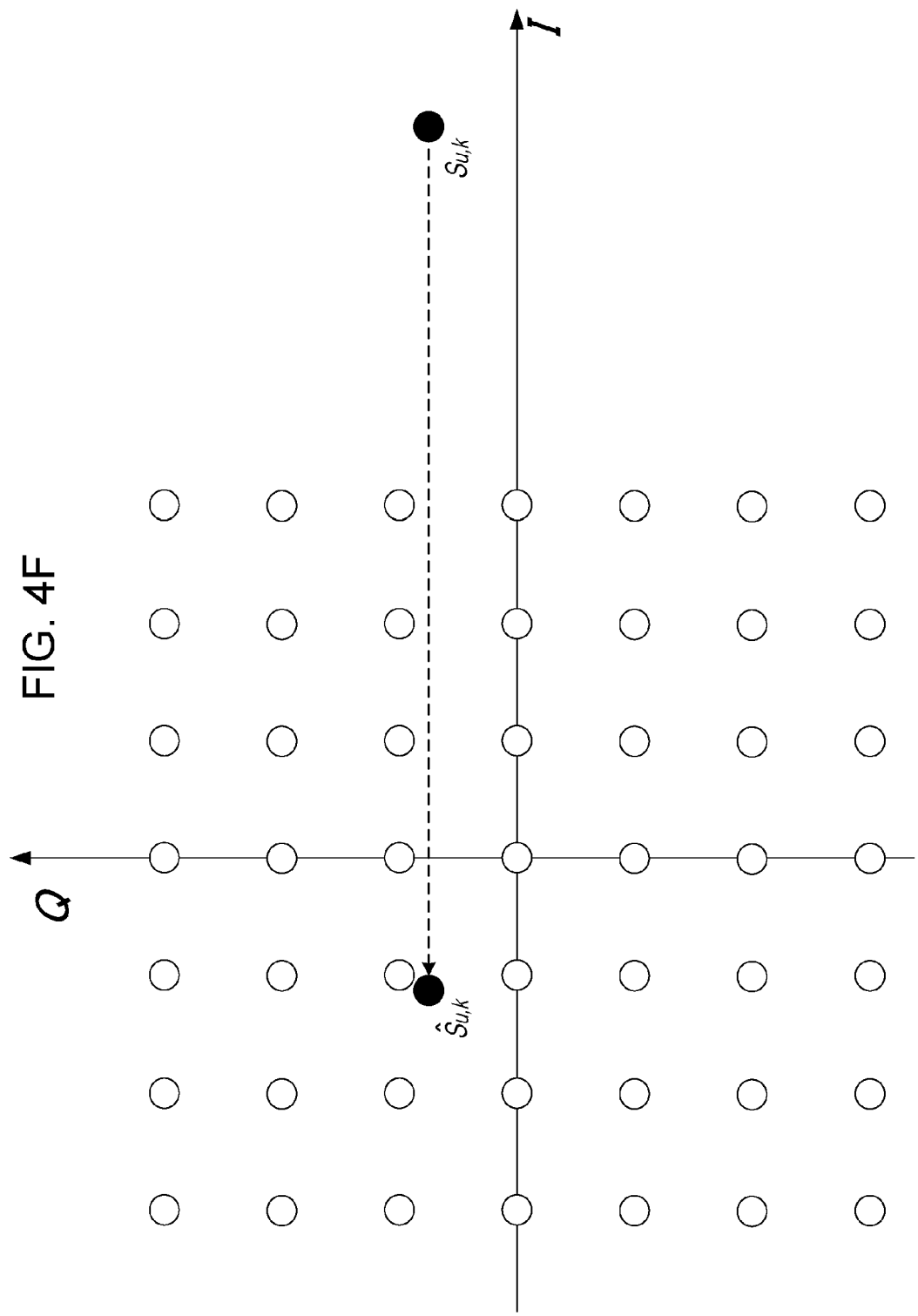

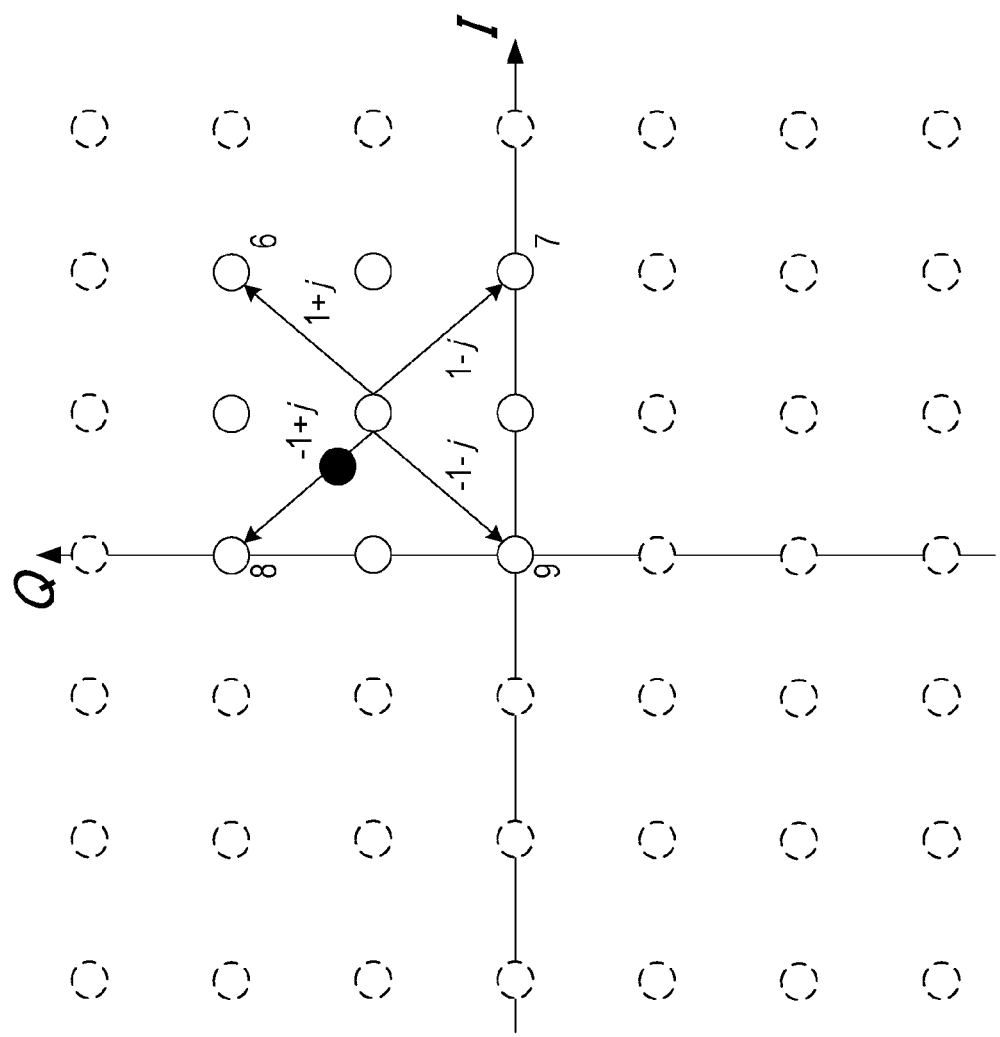

PRECODING APPARATUS, PROGRAM FOR PRECODING, AND INTEGRATED CIRCUIT

TECHNICAL FIELD

The present invention relates to a precoding technique for performing preliminary processing on transmission data transmitted from a wireless transmission apparatus including a plurality of antennas to a wireless reception apparatus.

BACKGROUND ART

It is always desired to improve the transmission rate of a wireless communication system in order to provide various broadband information services. Improvement of the transmission rate can be realized by increasing a communication bandwidth, but because there is a limitation in available frequency bands, it is essential to improve spectral efficiency. As a technique for significantly improving the spectral efficiency, a multiple input multiple output (MIMO) technique is attracting attention and has been put into practice in cellular systems, wireless LAN systems, and the like. The amount of improvement of the spectral efficiency realized by the MIMO technique is proportional to the number of transmission and reception antennas. However, the number of reception antennas that can be provided for a terminal apparatus is limited. Therefore, multi-user MIMO (MU-MIMO), in which a plurality of simultaneously connected terminal apparatuses are regarded as a virtual large-scale antenna array and transmission signals from a base station apparatus to the terminal apparatuses are spatially multiplexed, is effective in improving the spectral efficiency.

Because, in MU-MIMO, the transmission signals to the terminal apparatuses are received by the terminal apparatuses as inter-user interference (IUI), the IUI needs to be suppressed. For example, in Long Term Evolution (LTE), which is adopted as one of 3.9th generation mobile wireless communication systems, linear precoding is adopted in which the IUI is suppressed by multiplying, in advance, the transmission signals by a linear filter calculated on the basis of channel information transmitted from the terminal apparatuses. However, because the IUI cannot be effectively suppressed unless the orthogonality of the spatially multiplexed transmission signals of the terminals is high, only a limited amount of improvement can be achieved in MU-MIMO based on the linear precoding.

These days, a MU-MIMO technique that uses nonlinear precoding, in which nonlinear processing is performed by the base station apparatus, is attracting attention. When a modulo operation can be performed by the terminal apparatuses, a perturbation vector including complex numbers (perturbation terms) obtained by multiplying arbitrary Gaussian integers by a certain real number as elements can be added to the transmission signals. Therefore, by appropriately setting the perturbation vector in accordance with a channel state between the base station apparatus and the plurality of terminal apparatuses, required transmission power can be significantly reduced compared to in the linear precoding, in which the perturbation vector is not added, even when the orthogonality of the spatially multiplexed transmission signals of the terminals is not high. In the nonlinear precoding, vector perturbation (VP) described in NPL 1 may be used as a method for realizing optimal transmission performance. However, because the VP is a simultaneous estimation technique in which all selectable perturbation vectors are searched for an optimal perturbation vector, there is a problem in that the amount of operation exponentially increases relative to the number of multiplex terminals.

As a technique for reducing the amount of operation in the VP, SE-VP, which is based on sphere encoding (SE), is discussed in NPL 1. In the VP, in which countless perturbation vectors are added to the transmission signals, there are countless transmission signal candidate points. In the SE-VP, the amount of operation required for the search for a perturbation vector is reduced by performing the search while taking into consideration only transmission signal candidate points existing in a sphere drawn in a multidimensional signal point space. Although the SE-VP can reduce the amount of operation without reducing the transmission performance, an increase in the amount of operation relative to the number of multiplex terminals is still exponential.

In NPL 2, a technique for searching for a perturbation vector in the VP based on an M algorithm using QR decomposition is discussed. This technique will be referred to as QRM-VP hereinafter. The QRM-VP is a sequential search technique, and can suppress an increase in the amount of operation relative to the number of multiplex terminals in a polynomial manner. In the QRM-VP, the amount of operation is reduced by not performing operations on transmission signal candidate points that are irrelevant to the optimal perturbation vector, and the effect of reducing the amount of operation is larger than that of the SE-VP. However, because an operation needs to be performed to determine whether or not each transmission signal candidate point is irrelevant to the optimal perturbation vector, the degree of suppression of the amount of operation achieved while maintaining the transmission performance is limited.

Now, in SU-MIMO, which is MIMO transmission between a base station apparatus and a single terminal apparatus, the transmission performance significantly varies depending on a spatial demultiplexing technique used by the terminal apparatus. Maximum likelihood detection (MLD) is a simultaneous search technique that can realize the best transmission performance but, as with the VP, requires an enormous amount of operation, and although a technique for reducing the amount of operation using a QRM algorithm has been examined as with the VP, there is a limitation in the suppression of the amount of operation as with the QRM-VP. Therefore, in PTL 1, adaptive selection algorithm of surviving symbol replica candidates (ASESS) for reducing the amount of operation in SU-MIMO using the MLD is proposed. The ASESS can decrease the number of candidate signal points whose likelihood is to be detected in the MLD by ranking signal candidate points using simple signal processing. Significant suppression of the amount of operation can also be expected in the QRM-VP by applying an adaptive selection algorithm such as the ASESS, but in reality, a simple technique for decreasing the signal candidate points that is suitable for the QRM-VP has not been disclosed.

CITATION LIST

Patent Literature

PTL 1: Japanese Patent No. 4640793

Non Patent Literature

NPL 1: B. M. Hochwald, et. al. "A vector-perturbation technique for near-capacity multiantenna multiuser communication-Part II: Perturbation", IEEE Trans. Commun., Vol. 53, No. 3, March 2005.

NPL 2: M. Mohaisen, et. al. "Fixed-complexity vector perturbation with block diagonalization for MU-MIMO systems", Proc. IEEE Malaysia Inter. Conf. on Commun., 2009.

SUMMARY OF INVENTION

Technical Problem

With the QRM-VP, which is a technique for reducing the amount of operation in the VP, there is a limitation in reduction of the amount of operation. However, in reality, a technique for further reducing the amount of operation in the QRM-VP has not been disclosed.

The present invention has been conceived in view of such a circumstance, and an object thereof is to provide a precoding apparatus, a program for precoding, and an integrated circuit that realize more reduction of the amount of operation than in the QRM-VP while maintaining the transmission performance that can be achieved by the VP.

Solution to Problem (1) In order to achieve the above object, the present invention has taken the following measures. That is, a precoding apparatus in the present invention is a precoding apparatus that performs preliminary processing on transmission data transmitted from a wireless transmission apparatus including a plurality of antennas to at least one wireless reception apparatus. The precoding apparatus includes a linear filter generation unit that generates a linear filter on the basis of channel information between each antenna and the wireless reception apparatus, a signal conversion unit that expands perturbation term candidates of a perturbation vector to be added to a transmission data vector and a reference signal associated with the transmission data in a complex plane, and a perturbation vector search unit that searches for the perturbation vector to be added to the transmission data vector on the basis of the perturbation term candidates and the reference signal expanded in the complex plane. A transmission signal vector is calculated by adding a found perturbation vector to the transmission data vector and multiplying the transmission data vector by the linear filter.

As described above, the perturbation term candidates of the perturbation vector to be added to the transmission data vector and the reference signal associated with the transmission data are expanded in the complex plane, the perturbation vector to be added to the transmission data vector is searched for on the basis of the perturbation term candidates and the reference signal expanded in the complex plane, and the transmission signal vector is calculated by adding the found perturbation vector to the transmission vector and multiplying the transmission data vector by the linear filter. Accordingly, significant reduction of the amount of operation can be realized while keeping reduction of the transmission performance to the minimum. In addition, even when the number of multiplex terminal apparatuses increases, an increase in the amount of operation is not exponential but polynomial, and therefore a significant increase in the number of multiplex terminal apparatuses can be realized, thereby contributing to improvement of the spectral efficiency.

(2) In addition, in the precoding apparatus in the present invention, the perturbation vector includes a perturbation term, which is a complex number obtained by multiplying an arbitrary Gaussian integer by a real number associated with a method for data modulation applied to the transmission data, as an element.

As described above, since the perturbation vector includes a perturbation term, which is a complex number obtained by multiplying an arbitrary Gaussian integer by a real number associated with a method for data modulation applied to the transmission data, as an element, the required transmission power can be significantly reduced compared to linear precoding, in which a perturbation vector is not added, even when the orthogonality of spatially multiplexed transmission signals of terminals is not high.

(3) In addition, in the precoding apparatus in the present invention, the reference signal is calculated on the basis of perturbation term candidates of a perturbation vector associated with another reference signal.

As described above, since the reference signal is calculated on the basis of the perturbation term candidates of the perturbation vector associated with another reference signal, a perturbation vector closest to a reference signal point calculated from the candidates for another perturbation vector can be searched for.

(4) In addition, the precoding apparatus in the present invention further includes a channel matrix transformation unit that transforms a channel matrix indicating the channel information into a matrix that is suitable for any of matrix operations performed on the linear filter including QR decomposition, QL decomposition, and Cholesky decomposition. The signal transformation unit executes a matrix operation corresponding to the transformed channel matrix on the linear filter using the transformed channel matrix.

As described above, since the channel matrix indicating the channel information is transformed into a matrix that is suitable for any of the matrix operations performed on the linear filter including the QR decomposition, the QL decomposition, and the Cholesky decomposition, the value of M, which is the number of candidates for the perturbation term for each term, can be decreased without reducing the transmission performance.

(5) In addition, in the precoding apparatus, the channel matrix transformation unit multiplies the channel matrix by a unimodular matrix calculated on the basis of a lattice basis reduction technique or an ordering technique.

As described above, since the channel matrix is multiplied by the unimodular matrix calculated on the basis of the lattice basis reduction technique or the ordering technique, the value of M, which is the number of candidates for the perturbation term for each term without reducing the transmission performance.

(6) In addition, in the precoding apparatus in the present invention, in a case where wireless resources have a high correlation, the channel matrix transformation unit transforms the channel matrix while sharing part of information included in the unimodular matrix.

As described above, since, in a case where the wireless resources have a high correlation, the channel matrix transformation unit transforms the channel matrix while sharing part of the information included in the unimodular matrix, the number of times that a transformation matrix should be calculated can be reduced in accordance with the states of channels. As a result, the amount of operation can be further reduced.

(7) In addition, in the precoding apparatus in the present invention, the perturbation vector search unit divides the complex plane into a plurality of divisions, identifies a division including the reference signal, selects perturbation term candidates included in the identified division as candidates for a perturbation term to be added to the transmission data, and searches for the perturbation vector to be added to the transmission data vector.

As described above, the complex plane is divided into the plurality of divisions, the division including the reference signal is identified, the perturbation term candidates included in the identified division are selected as the candidates for the perturbation term to be added to the transmission data, and the perturbation vector to be added to the transmission data vector is searched for. Accordingly, no limitation needs to be put on the value of K, which is the number of essentially selectable Gaussian integers, and the number of times that metric calculation is performed for each term can be limited to M, which is the number of candidates for the perturbation term for each term.

(8) In addition, the precoding apparatus in the present invention, the perturbation vector search unit detects a Gaussian integer closest to the reference signal, adds the detected Gaussian integer to a Gaussian integer string arranged in an ascending order of value, selects the Gaussian integer string to which the detected Gaussian integer has been added as candidates for a perturbation term to be added to the transmission data, and searches for the perturbation vector to be added to the transmission data vector on the basis of the selected candidates for the perturbation term.

As described above, the Gaussian integer closest to the reference signal is detected, the detected Gaussian integer is added to the Gaussian integer string arranged in an ascending order of value, the Gaussian integer string to which the detected Gaussian integer has been added is selected as the candidates for the perturbation term to be added to the transmission data, and the perturbation vector to be added to the transmission data vector is searched for on the basis of the selected candidates for the perturbation term. Accordingly, the ordering of the perturbation terms can be performed.

(9) In addition, in the precoding apparatus in the present invention, the wireless reception apparatus transmits, to the wireless transmission apparatus, information associated with spatial correlation between channels between the wireless reception apparatus and the wireless transmission apparatus, and a number of candidates for a perturbation term to be added to the transmission data is determined on the basis of the information associated with the spatial correlation.

As described above, since the wireless reception apparatus transmits, to the wireless transmission apparatus, the information associated with the spatial correlation between the channels between the wireless reception apparatus and the wireless transmission apparatus and the number of candidates for the perturbation term to be added to the transmission data is determined on the basis of the information associated with the spatial correlation, the number of candidates for the perturbation term can be optimized even in an environment in which a spatial correlation value significantly varies over time, thereby improving the transmission performance.

(10) In addition, in the precoding apparatus in the present invention, the perturbation vector search unit determines priority ranking of the perturbation vector.

As described above, since the priority ranking of the perturbation vector is determined, no limitation needs to be put on the value of K, which is the number of essentially selectable Gaussian integers, and the number of times that the metric calculation is performed for each term can be limited to M, which is the number of candidates for the perturbation term for each term.

(11) In addition, in the precoding apparatus in the present invention, the perturbation vector search unit searches for a perturbation vector with which required transmission power becomes lowest.

As described above, since the perturbation vector with which required transmission power becomes lowest is searched for, no limitation needs to be put on the value of K, which is the number of essentially selectable Gaussian integers, and the number of times that the metric calculation is performed for each term can be limited to M, which is the number of candidates for the perturbation term for each term.

(12) In addition, in the precoding apparatus, the required transmission power is calculated on the basis of transmission power calculated for a perturbation vector associated with another reference signal.

As described above, since the required transmission power is calculated on the basis of the transmission power calculated for the perturbation vector associated with another reference signal, no limitation needs to be put on the value of K, which is the number of essentially selectable Gaussian integers, and the number of times that the metric calculation is performed for each term can be limited to M, which is the number of candidates for the perturbation term for each term.

(13) In addition, a program for precoding in the present invention is a program for precoding that performs preliminary processing on transmission data transmitted from a wireless transmission apparatus including a plurality of antennas to at least one wireless reception apparatus. The program causes a computer to execute a series of processes including a process for generating a linear filter on the basis of channel information between each antenna and the wireless reception apparatus, a process for expanding perturbation term candidates of a perturbation vector to be added to a transmission data vector and a reference signal associated with the transmission data in a complex plane, a process for searching for the perturbation vector to be added to the transmission data vector on the basis of the perturbation term candidates and the reference signal expanded in the complex plane, and a process for calculating a transmission signal vector by adding a found perturbation vector to the transmission data vector and multiplying the transmission data vector by the linear filter.

As described above, the perturbation term candidates of the perturbation vector to be added to the transmission data vector and the reference signal associated with the transmission data are expanded in the complex plane, the perturbation vector to be added to the transmission data vector is searched for on the basis of the perturbation term candidates and the reference signal expanded in the complex plane, and the transmission signal vector is calculated by adding the found perturbation vector to the transmission vector and multiplying the transmission data vector by the linear filter. Accordingly, significant reduction of the amount of operation can be realized while keeping reduction of the transmission performance to the minimum. In addition, even when the number of multiplex terminal apparatuses increases, an increase in the amount of operation is not exponential but polynomial, and therefore a significant increase in the number of multiplex terminal apparatuses can be realized, thereby contributing to improvement of the spectral efficiency.

(14) In addition, an integrated circuit in the present invention is an integrated circuit that is mounted on a wireless transmission apparatus including a plurality of antennas and that causes the wireless transmission apparatus to realize a precoding function for performing preliminary processing on transmission data transmitted to at least one wireless reception apparatus. The precoding function is a series of functions including a function of generating a linear filter on the basis of channel information between each antenna and the wireless reception apparatus, a function of expanding perturbation term candidates of a perturbation vector to be added to a transmission data vector and a reference signal associated with the transmission data in a complex plane, a function of searching for the perturbation vector to be added to the transmission data vector on the basis of the perturbation term candidates and the reference signal expanded in the complex plane, and a function of calculating a transmission signal vector by adding a found perturbation vector to the transmission data vector and multiplying the transmission data vector by the linear filter.

As described above, the perturbation term candidates of the perturbation vector to be added to the transmission data vector and the reference signal associated with the transmission data are expanded in the complex plane, the perturbation vector to be added to the transmission data vector is searched for on the basis of the perturbation term candidates and the reference signal expanded in the complex plane, and the transmission signal vector is calculated by adding the found perturbation vector to the transmission vector and multiplying the transmission data vector by the linear filter. Accordingly, significant reduction of the amount of operation can be realized while keeping reduction of the transmission performance to the minimum. In addition, even when the number of multiplex terminal apparatuses increases, an increase in the amount of operation is not exponential but polynomial, and therefore a significant increase in the number of multiplex terminal apparatuses can be realized, thereby contributing to improvement of the spectral efficiency.

Advantageous Effects of Invention

According to the present invention, nonlinear precoding by which the amount of operation is significantly reduced while maintaining the same transmission performance as in the VP. By using the nonlinear precoding in the present invention in downlink MU-MIMO, in which the spectral efficiency improves in proportion to the number of multiplex terminals, a significant improvement in the spectral efficiency can be realized without being afraid of an increase in the amount of operation according to an increase in the number of multiplex terminals.

BRIEF DESCRIPTION OF DRAWINGS

FIG. 4A is a diagram depicting a relationship between $S_{u,k}$ and $(-2\delta z_{u,k})$ in Expression (10) according to the first embodiment of the present invention in a complex plane.

FIG. 4C is a diagram depicting the relationship between $S_{u,k}$ and $(-2\delta z_{u,k})$ in Expression (10) according to the first embodiment of the present invention in the complex plane (illustrates a state in which lines for dividing each quadrant have been drawn).

FIG. 4D is a diagram depicting the relationship between $S_{u,k}$ and $(-2\delta z_{u,k})$ in Expression (10) according to the first embodiment of the present invention in the complex plane (illustrates a state after the above-described division of the quadrants is repeatedly performed).

FIG. 4E is a diagram depicting an example of a relationship between $S_{u,k}$ and $(-z_{u,k})$ in Expression (10) according to the first embodiment of the present invention in the complex plane.

FIG. 4F is a diagram depicting a relationship between $S_{u,k}$, $\hat{S}_{u,k}$, and $(-z_{u,k})$ in Expression (11) according to the first embodiment of the present invention in the complex plane.

FIG. 4I is a diagram depicting relationships between $S_{u,k}$ and $\{z_{u,1}$ to $z_{u,9}\}$ according to the first embodiment of the present invention in the complex plane.

DESCRIPTION OF EMBODIMENTS

Embodiments when a wireless communication system in the present invention is applied will be described hereinafter with reference to the drawings. It is to be understood that items described in the embodiments are just an aspect for understanding the invention, and the content of the invention is not to be interpreted as limited to the embodiments.

1. First Embodiment

In a first embodiment, MU-MIMO transmission will be described in which U terminal apparatuses (also referred to as wireless reception apparatuses), each of which includes a reception antenna, are connected to a base station apparatus (also referred to as a wireless transmission apparatus) having $N_t$ transmission antennas and capable of performing nonlinear precoding, and $N_t$=U. The base station apparatus obtains information regarding channels to the terminal apparatuses using control information transmitted from the terminal apparatuses, and performs the precoding on transmission data for each subcarrier on the basis of the channel information. It is to be noted that the number of reception antennas included in each terminal apparatus is not limited to one. In addition, in this embodiment, the number of data streams (also referred to as the number of ranks) transmitted to each terminal apparatus is one, but a case in which the number of ranks is two or more is also included in this embodiment.

First, the channel information between the base station apparatus and the terminal apparatuses will be defined. In this embodiment, a quasi-static frequency-selective fading channel is assumed. When the complex channel gain of a k-th subcarrier between an n-th transmission antenna (n=1 to $N_t$) and a u-th terminal apparatus (u=1 to U) is denoted by $h_{u,n}(k)$, a channel matrix H(k) is defined as follows:

[Math. 1]

$$H(k) = \begin{pmatrix} h_{1,1}(k) & \cdots & h_{1,Nt}(k) \\ \vdots & \ddots & \vdots \\ h_{U,1}(k) & \cdots & h_{U,Nt}(k) \end{pmatrix} \quad (1)$$

[1.1 Base Station Apparatus]

Figure 1:
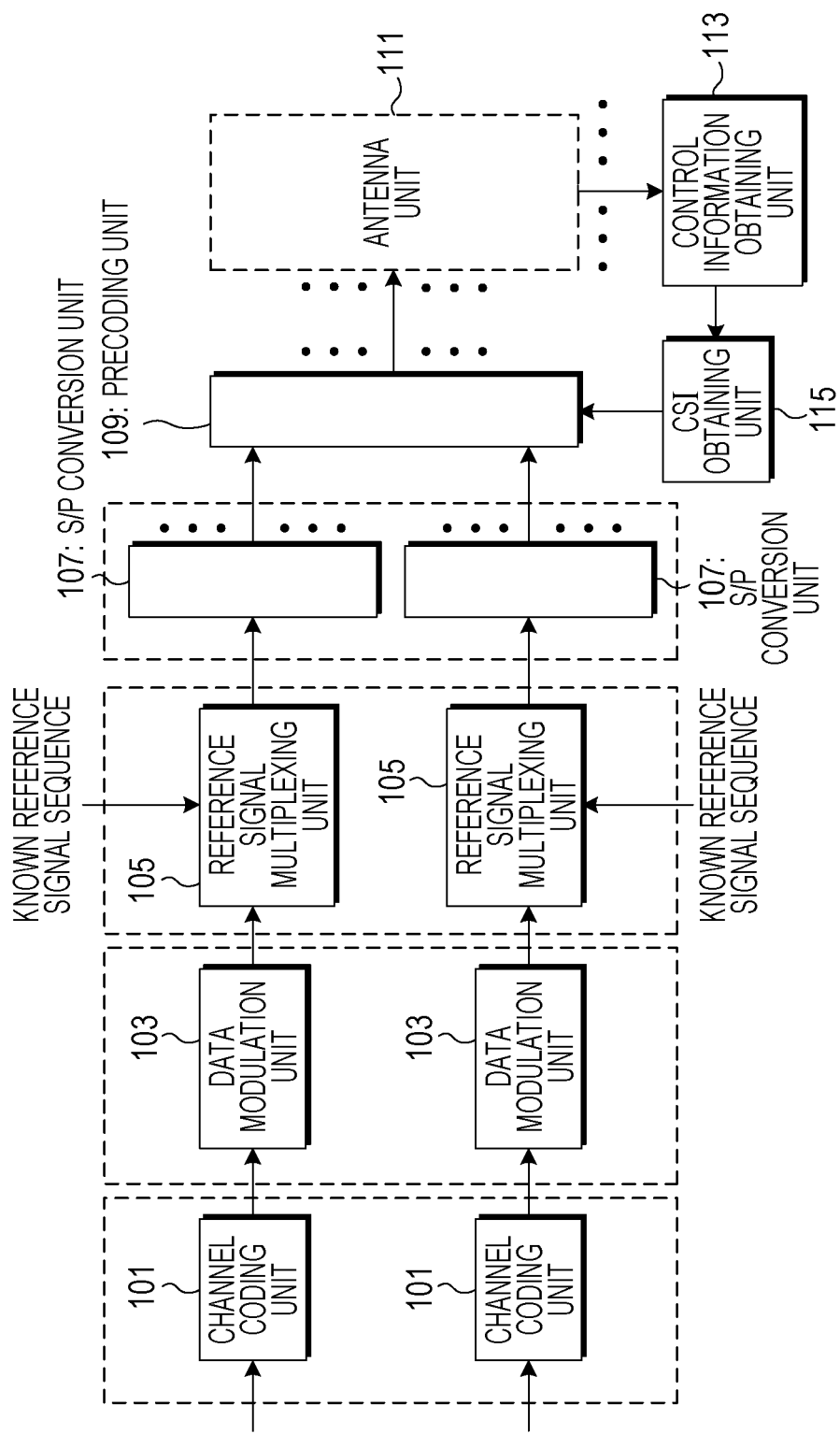
FIG. 1 is a block diagram illustrating the configuration of a base station apparatus according to a first embodiment of the present invention.

FIG. 1 is a block diagram illustrating the configuration of the base station apparatus according to the first embodiment of the present invention. As illustrated in FIG. 1, the base station apparatus is configured by including channel coding units 101, data modulation units 103, reference signal multiplexing units 105, S/P conversion units 107, precoding units 109, antenna units 111, a control information obtaining unit 113, and a CSI obtaining unit 115. There are the same number of precoding units 109 as the number of subcarriers $N_c$ and there are the same number of antenna units 111 as the number of transmission antennas $N_t$. A transmission data sequence for each terminal apparatus is subjected to channel coding in the channel coding unit 101, and then subjected to data modulation in the data modulation unit 103, such as QPSK or 16-QAM. The output of the data modulation unit 103 is input to the reference signal multiplexing unit 105, and a known reference signal sequence for performing channel estimation in each terminal apparatus is multiplexed in the reference signal multiplexing unit 105.

The reference signals for the terminal apparatuses are multiplexed orthogonally to one another so that the terminal apparatuses that have received the reference signals can demultiplex the reference signals. In addition, in the reference signals, two types of reference signals, namely a CRS, which is a reference signal for the channel estimation, and a DM-RS, which is a reference signal for demodulation, are multiplexed. The CRS is used for estimating the channel matrix represented by Expression (1), and the DM-RS is used for estimating information relating to the precoding, which will be described later. A method for multiplexing the CRS and the DM-RS is not particularly limited; however, CRSS are disposed in such a way as to be orthogonal to one another between the transmission antennas and DM-RSs are disposed in such a way as to be orthogonal to one another between the connected terminal apparatuses. As a method for orthogonally multiplexing the CRSS and the DM-RSs, any of time orthogonal, frequency orthogonal, space orthogonal, code orthogonal, and pseudo-code orthogonal techniques or a combination between a plurality of orthogonal techniques may be used. In this embodiment, it is assumed in the following description that data signals and reference signals are subjected to a frequency orthogonal technique and the terminal apparatuses can ideally estimate desired information.

Outputs of the reference signal multiplexing units 105 is input to the S/P conversion units 107 and converted into $N_c$ parallel signal sequences for every $N_c$ samples as a result of serial-to-parallel conversion. The number of outputs of the S/P conversion units 107 is $N_c$, which is the number of subcarriers, and each output is input to the precoding unit 109 corresponding to each subcarrier. Signal processing performed in each precoding unit 109 will be described later, and, in the following description, signal processing performed on an output of each precoding unit 109 will be described first. The output of the precoding unit 109 for each subcarrier is input to the antenna unit 111 of a corresponding transmission antenna.

Figure 2:
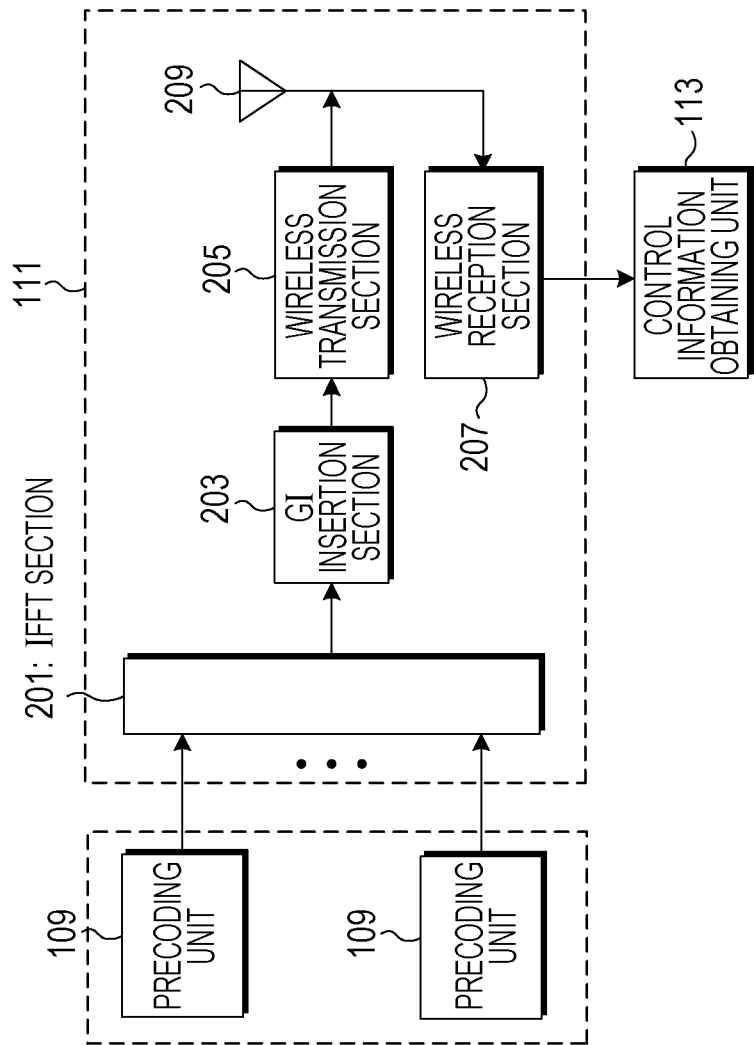
FIG. 2 is a block diagram illustrating the device configuration of an antenna unit 111 according to the first embodiment of the present invention.

FIG. 2 is a block diagram illustrating the device configuration of the antenna unit 111 according to the first embodiment of the present invention. As illustrated in FIG. 2, the antenna unit 111 is configured by including an IFFT section 201, a GI insertion section 203, a wireless transmission section 205, a wireless reception section 207, and an antenna 209. In each antenna unit 111, outputs of the corresponding precoding units 109 are input to the IFFT section 201 and an $N_c$-point inverse fast Fourier transform (IFFT) or an $N_c$-point inverse discrete Fourier transform (IDFT) is applied. As a result, an OFDM signal having $N_c$ subcarriers is generated and output from the IFFT section 201. Although it is assumed that the number of subcarriers and the number of points of the inverse discrete Fourier transform are the same here, the number of points is larger than the number of subcarriers when a guard band is set in a frequency domain. An output of the IFFT section 201 is input to the GI insertion section 203, in which guard intervals are added, and then input to the wireless transmission section 205. In the wireless transmission section 205, a transmission signal in a baseband is converted into a transmission signal in a radio frequency (RF) band. An output signal of the wireless transmission section 205 is transmitted by the antenna 209. It is to be noted that the wireless reception section 207 receives information associated with the channel information estimated by each terminal apparatus, and the information is output toward the control information obtaining unit 113.

[1.2 Precoding Devices]

The signal processing performed in each precoding unit 109 will be described. The precoding unit 109 for the k-th subcarrier will be described hereinafter, and a case in which a data signal component of the output of the reference signal multiplexing unit 105 has been input will be described first.

Figure 3:
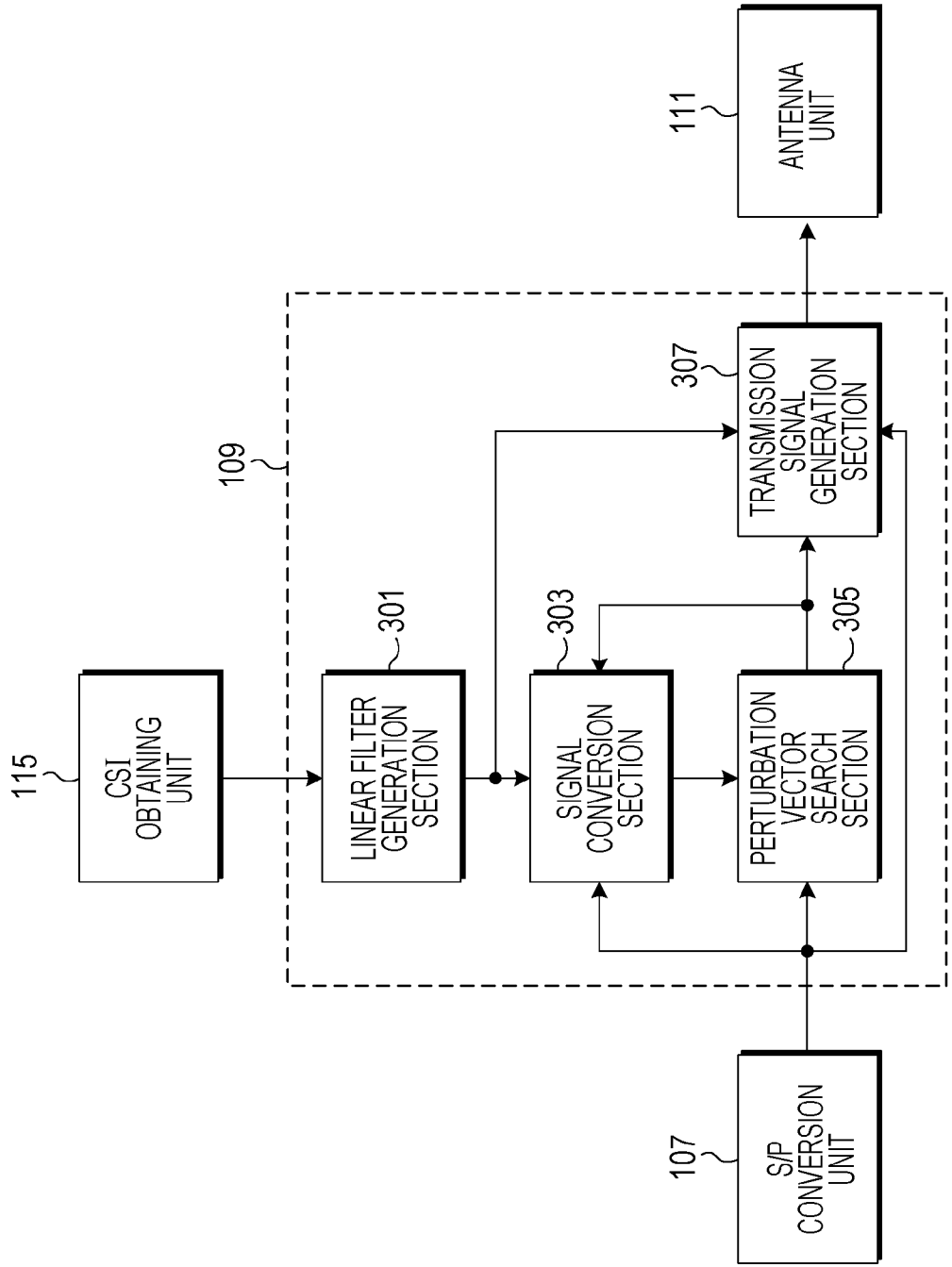
FIG. 3 is a block diagram illustrating the device configuration of a precoding unit 109 according to the first embodiment of the present invention.

FIG. 3 is a block diagram illustrating the device configuration of the precoding unit 109 according to the first embodiment of the present invention. As illustrated in FIG. 3, the precoding unit 109 is configured by including a linear filter generation section 301, a signal conversion section 303, a perturbation vector search section 305, and a transmission signal generation section 307. A k-th subcarrier component $\{d_u(k); u=1 \text{ to } U\}$ of the output of the S/P conversion unit 107 relating to transmission data for each terminal apparatus and the channel matrix H(k) of the k-th subcarrier of the output of the CSI obtaining unit 115 are input to the precoding unit 109. H(k) is estimated by each terminal apparatus on the basis of the above-describe CRS, and transmitted to the base station apparatus. In the following description, it is assumed that H(k) is ideally obtained by the CSI obtaining unit 115, and an index k is omitted in order to simplify the description.

First, the linear filter generation section 301 generates a linear filter W. As the linear filter, a filter based on a ZF criterion ($W=H^{-1}$) or a filter based on an MMSE criterion ($W=H^H(HH^H+\alpha I)^{-1}$) is generated. It is to be noted that $A^{-1}$ denotes an inverse matrix of a matrix A, and $A^H$ denotes an associate matrix (Hermitian transpose matrix) of the matrix A. $\alpha$ denotes an interference term determined in accordance with transmission power or the like, but, for example, $\alpha$ may be set to the reciprocal of a transmission power-to-reception noise power ratio of one terminal apparatus. A case in which a linear filter based on the ZF criterion has been generated will be mainly described hereinafter. The generated linear filter is input to the signal conversion section 303. A transmission data vector $d=[d_1, \ldots, d_U]^T$ ($A^T$ denotes a transpose matrix of the matrix A) and the linear filter W are input to the signal conversion section 303 and subjected to a signal conversion process for searching for a perturbation vector. Signal conversion will be described hereinafter. A transmission signal vector $s=[s_1, \ldots, s_{NT}]^T$ after precoding when VP has been applied is represented by Expression (2).

[Math. 2]

$$s = \beta W(d + 2\delta z) \quad (2)$$

Here, $2\delta Z = 2\delta [z_1, \ldots, z_U]^T$ denotes a perturbation vector. $\{z_u; u=1 \text{ to } U\}$ denotes a perturbation term added to transmission data $\{d_u\}$ for the u-th terminal apparatus, and is given as an arbitrary Gaussian integer. Here, a Gaussian integer refers to a complex number whose real part and imaginary part are integers. A constant $\delta$ is determined depending on the method for data modulation applied by the data modulation unit 103. For example, $2\delta = 2 \times 2^{1/2}$ in the case of QPSK, and $2\delta = 8/10^{1/2}$ in the case of 16-QAM. $\beta$ denotes a power normalization term with constant transmission power, and is obtained as the reciprocal of the norm of a vector W $(d+2\delta Z)$. It is to be noted that the normalization of power may be performed not for each symbol but for a certain number of wireless resources. For example, control may be performed such that transmission power is kept constant between twelve subcarriers. Any Gaussian integer may be set to the perturbation term, which is a component of Z. In the VP, Z at which required transmission power becomes smallest is searched for. That is, Z is calculated by solving the following minimization problem:

[Math. 3]

$$Z = \arg\min_{Z \in Z_G} \|W(d + 2\delta Z)\|^2 \quad (3)$$

Here, $Z_G$ denotes a set of all Gaussian integer vectors. It is to be noted that a minimization problem when a linear filter based on the MMSE criterion is used is obtained by replacing $\|W(d+2\delta Z)\|^2$ in Expression (3) by $(d+2\delta Z)^H (HH^H + \alpha I)^{-1} (d+2\delta Z)$. However, this minimization problem is an integer lattice least squares problem in 2U dimensions, and has a problem in that the amount of operation exponentially increases relative to the number of dimensions, that is, a spatial multiplexing number U. Therefore, in this embodiment, a simple perturbation vector search algorithm derived from a technique for reducing the amount of operation based on an M algorithm using QR decomposition will be disclosed.

The minimization problem represented by Expression (3) can be rewritten as Expression (4).

[Math. 4]

$$\begin{aligned} Z &= \arg\min_{Z \in Z_G} \|W(d + 2\delta Z)\|^2 \\ &= \arg\min_{Z \in Z_G} \|L(d + 2\delta Z)\|^2 \end{aligned} \quad (4)$$

Here, $L^H L = W^H W$, and L denotes a lower triangular matrix. Such a lower triangular matrix L can be obtained by Cholesky decomposition. The lower triangular matrix may be generated on the basis of QL decomposition. Alternatively, the same minimization problem as Expression (4) may be obtained using an upper triangular matrix R on the basis of the QR decomposition. It is to be noted that even when a linear filter based on the MMSE criterion is used, an expression of a minimization problem can be represented as Expression (4) by obtaining a lower triangular matrix that satisfies $(HH^H + \alpha I)^{-1} = L^H L$. By expanding the numerical part of Expression (4), Expression (5) is obtained.

[Math. 5]

$$\begin{aligned} \|L(d + 2\delta Z)\|^2 &= |L_{1,1}(d_1 + 2\delta z_1)|^2 + |L_{2,1}(d_1 + 2\delta z_1) + \\ &\quad L_{2,2}(d_2 + 2\delta z_2)| + \ldots + \\ &\quad \left|\sum_{i=1}^{u} L_{u,i}(d_i + 2\delta z_i)\right|^2 + \ldots \\ &= \sum_{u=1}^{U} \left|\sum_{i=1}^{u} L_{u,i}(d_i + 2\delta z_i)\right|^2 \end{aligned} \quad (5)$$

Here, $L_{m,n}$ denotes a component of the matrix L in an m-th row and an n-th column. Since $\{L_{m,n}\}$ and $\{d_u\}$ have already been given, a first term in the right side of Expression (5) depends only on a perturbation term $z_1$. Therefore, $z_1$ that minimizes the first term can be easily obtained. Here, $z_1$ that minimizes the first term is denoted by $z_{1,1}$. Once $z_1$ has been obtained, a second term in the right side of Expression (5) depends only on $z_2$. By sequentially detecting perturbation terms in this manner from the first term, a perturbation vector Z can be easily detected. That is, by changing the expression like Expression (5), a simultaneous estimation problem can be transformed into a sequential estimation problem. However, because $z_{1,1}$, which minimizes the first term, is not necessarily a candidate for $z_1$ that minimizes the second term and later, the perturbation vector Z detected in such a manner is not optimal. Therefore, in the method based on the M algorithm, M candidates for the perturbation term for each term are caused to survive. In the following description, a "term" will also be referred to as a "stage" for convenience of description. In addition, the value in each stage will be referred to as the stage metric in a u-th stage. That is:

[Math. 6]

$$P_{u,k} = |L_{u,u}(d_u + 2\delta z_{u,k}) + \Sigma_{i=1}^{u-1} L_{u,i}(d_i + 2\delta z_i)|^2 \quad (6)$$

Basically, when the stage metric in the u-th stage is to be calculated, the perturbation term candidates up to the (u−1)th stage have already been determined, and therefore the stage metric depends only on a k-th perturbation term candidate $z_{u,k}$ in the u-th stage. In addition, it is assumed in the following description that the number of survivors M is the same between all the stages, but a different number of survivors may be used in each stage.

$\{z_{1,1} \text{ to } z_{1,K}\}$ are extracted as candidates for the perturbation term $z_1$ for the first term, and stage metrics $\{P_{1,1} \text{ to } P_{1,K}\}$ of these candidates are calculated. An arbitrary Gaussian integer may be applied as the perturbation term $z_1$, but it is assumed here that the number of selectable Gaussian integers is limited to K. Thereafter, M perturbation term candidates $\{z_{1,1} \text{ to } z_{1,m}\}$ whose stage metrics are smaller are caused to survive. Next, in the second stage, the stage metrics of candidates $\{z_{2,1} \text{ to } z_{2,K}\}$ for the perturbation term $z_2$ in the second stage are calculated. At this time, since there are M candidates for the perturbation term $z_1$, a total of (K×M) stage metrics are calculated. A path metric (represents the sum of the stage metrics in each stage) is then calculated using the calculated stage metrics. Here, for example, a path metric $V_{2,(i,j)}$ in the second stage when has been selected as a candidate for $z_1$ and $z_{2,1}$ has been selected as a candidate for $z_2$ is represented by Expression (7).

[Math. 7]

$$V_{2,(i,j)} = |L_{2,1}(d_1 + 2\delta z_{1,j}) + L_{2,2}(d_2 + 2\delta z_{2,i})|^2 + P_{1,j} \quad (7)$$

That is, by adding a stage metric that is being examined to a path metric (in the first stage, the path metric=the stage metric) calculated on the basis of the perturbation terms that have been selected, a total path metric is calculated. Among a total of (K×M) path metrics that have been calculated, smaller M path metrics are then caused to survive. That is, ($V_{2,1}$ to $V_{2,m}$) path metrics are extracted in the second stage, and perturbation vector candidates $Z_{2,1}$ to $Z_{2,M}$ including, as elements thereof, perturbation term candidates that give these path metrics are also caused to survive. For example, when perturbation term candidates that give $V_{2,m}$ are $z_{1,j}$ and $z_{2,i}$, $Z_{2,m}=[z_{1,j}, z_{2,i}]^T$. The same calculation is then performed up to a U-th term, and, in the end, a perturbation vector composed of perturbation term candidates whose path metrics are the smallest becomes an optimal perturbation vector.

The method for searching for a perturbation vector based on the M algorithm has been described above. In the above method, the amount of operation in each stage is limited to that of operations for (M×K) metrics, and accordingly the amount of operation can be significantly reduced compared to when Expression (3) is directly solved. However, a few problems arise when the M algorithm is used for searching for a perturbation vector in the VP. One of the problems is the number of perturbation term candidates K for each term. There are countless perturbation term candidates since a perturbation term is originally an arbitrary Gaussian integer, but in practice the perturbation term is selected from a certain number of candidates K. However, the optimal value of K is different depending on a channel environment and the like. A large K needs to be set in order to realize optimal transmission in any environment, but the amount of operation undesirably increases in proportion to the value of K.

Another problem is the number of times of calculation (M×K) of path metrics in each stage. Since M candidates are caused to survive after (M×K) path metrics are calculated in the M algorithm, (M×(K−1)) times of calculation are wasted. When the amount of operation allowed in the calculation in each stage is limited to a certain value, the number of survivors M needs to be small since the value of K tends to be large as described above. When the number of survivors is small, however, a decrease in transmission performance is caused.

Therefore, in this embodiment, a method for solving the above two problems posed by the method for searching for a perturbation vector using the QR decomposition based on the M algorithm will be disclosed. According to the method in this embodiment, the value of K need not essentially be limited, and the number of times of calculation of metrics for each term can be limited to M.

The basis of the method in the present invention is to limit candidates for a perturbation term on which metric calculation is to be performed before the metric calculation is performed. A case in which a method that applies quadrant search is used will be described hereinafter. A stage metric $P_{u,k}$ relating to perturbation term candidates $\{z_{u,1}$ to $z_{u,K}\}$ in the u-th stage is calculated using Expression (8). Here, perturbation term candidates $\{z_1$ to $z_{u-1}\}$ up to the (u−1) stage correspond to one of the math metrics of M candidates.

[Math. 8]

$$P_{u,k} = \left| L_{u,u}(d_u + 2\delta z_{u,k}) + \sum_{i=1}^{u-1} L_{u,i}(d_i + 2\delta z_i) \right|^2 \quad (8)$$

The signal conversion section 303 performs signal processing for transforming Expression (8) into Expression (9).

[Math. 9]

$$P_{u,k} = |2\delta L_{u,u}|^2 \left| \frac{1}{2\delta} d_u + \frac{1}{2\delta} \sum_{i=1}^{u-1} \frac{L_{u,i}}{L_{u,u}}(d_i + 2\delta z_i) - (-z_{u,k}) \right|^2 \quad (9)$$

The perturbation term candidate $z_{u,k}$ minimizes Expression (9). That is, a signal $(-z_{u,k})$ closest to a reference signal given by Expression (10) is searched for.

[Math. 10]

$$S_{u,k} = \frac{1}{2\delta} d_u + \frac{1}{2\delta} \sum_{i=1}^{u-1} \frac{L_{u,i}}{L_{u,u}}(d_i + 2\delta z_i) \quad (10)$$

FIG. 4A is a diagram depicting a relationship between $S_{u,k}$ and $(-z_{u,k})$ in Expression (10) according to the first embodiment of the present invention in a complex plane. A complex plane normally extends infinitely, but for the purpose of convenience, only part of the complex plane within a certain width is illustrated here. In FIG. 4A, a black circle represents $S_{u,k}$, and white circles represent candidates for $(-z_{u,k})$. In the calculation performed in the u-th stage, M white circles close to the black circle are detected, and in the method based on the M algorithm, squared Euclidean distances between the black circle and all the white circles are calculated and M white circles are detected on the basis of results of the calculation. However, by focusing upon a state illustrated FIG. 4A, the distances between the black circle and the white circles can be measured with a certain degree of accuracy without calculating the squared Euclidean distances.

First, since the black circle is now located in a first quadrant of the complex plane, the white circles in the first quadrant are closer to the black circle than the white circles in second and fourth quadrants, and the white circles in a third quadrant are farthest from the black circle. Therefore, the white circles in the first quadrant, the second quadrant, the fourth quadrant, and the third quadrant are sequentially weighted in this order. Ordering of the white circles located in the same quadrant may be appropriately performed.

Figure 4B:
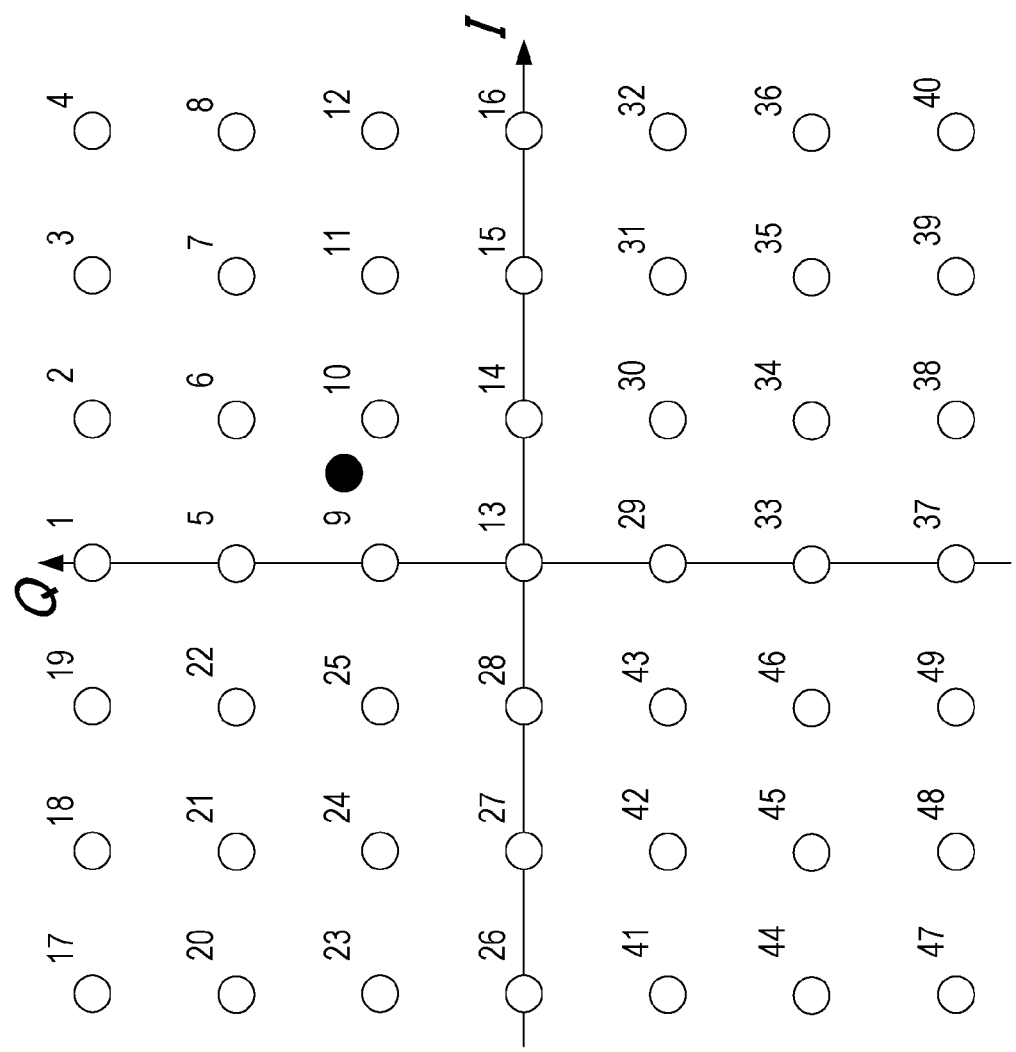
FIG. 4B is a diagram depicting the relationship between $S_{u,k}$ and $(-2\delta z_{u,k})$ in Expression (10) according to the first embodiment of the present invention in the complex plane (illustrates a state in which ordering has been performed from the upper left).

FIG. 4B is a diagram depicting the relationship between $S_{u,k}$ and $(-z_{u,k})$ in Expression (10) according to the first embodiment of the present invention in the complex plane (illustrates a state in which ordering has been performed from the upper left).

FIG. 4C is a diagram depicting the relationship between $S_{u,k}$ and $(-z_{u,k})$ in Expression (10) according to the first embodiment of the present invention in the complex plane (illustrates a state in which lines for dividing each quadrant have been drawn). Weightings are then sequentially assigned to the white circles located in quadrants closer to the quadrant in which the black circle is located.

FIG. 4D is a diagram depicting the relationship between $S_{u,k}$ and $(-z_{u,k})$ in Expression (10) according to the first embodiment of the present invention in the complex plane (illustrates a state after the above-described division of the quadrants is repeatedly performed). By repeating the division a sufficient number of times, ordering (ranking) from 1 to M can be performed for the candidate white circles for $(-z_{u,k})$. In doing so, M white circles closer to the black circle can be detected without calculating the squared Euclidean distances.

In the quadrant search, a complex operation such as complex multiplication is not required at all. Although the number of candidates for the perturbation term is limited to 49 for convenience of description in the above description, the amount of operation hardly increases even if the number of candidates for the perturbation term is larger than 49. Therefore, unlike the QRM-VP, there is no need to add a special limitation to the candidates for the perturbation term, but in practice, a certain limitation is added as in the method taken as an example in the above description. When, for example, spatial correlation is extremely strong, however, the black circle, which represents the reference signal, might have an extremely different value from candidate points for the perturbation term.

FIG. 4E is a diagram depicting the relationship between $S_{u,k}$ and $(-z_{u,k})$ in Expression (10) according to the first embodiment of the present invention in the complex plane. In such a case, correct ordering might not be performed even if the quadrant search is used. Therefore, it is assumed that before the ordering process described above, a modulo operation with a modulo width of $2\Delta$ is performed for $S_{u,k}$. That is, a new reference signal $\hat{S}_{u,k}$ that satisfies the following expression is calculated:

[Math. 11]

$$\hat{S}_{u,k} = S_{u,k} - 2\Delta \text{floor}\left(\frac{S_{u,k}}{2\Delta} + \frac{(1+j)}{2}\right) \quad (11)$$
$$= S_{u,k} - B_{u,k}$$

Here, floor(c) is a function that returns a complex number whose real part and imaginary part are largest integers that do not exceed the real part and the imaginary part, respectively, of a complex number c, and also referred to as a floor function. In addition, the value of $2\Delta$ is determined by the limitation added to the perturbation term candidates, and by adding integral multiples of $2\Delta$ to the real parts and the imaginary parts of the perturbation term candidates, perturbation term candidate points are arranged in the complex plane at regular intervals. For example, when the limitation has been added as illustrated in FIG. 4E, $2\Delta=7$.

FIG. 4F is a diagram depicting a relationship between $S_{u,k}$, $\hat{S}_{u,k}$, and $(-z_{u,k})$ in Expression (11) according to the first embodiment of the present invention in the complex plane. After $\hat{S}_{u,k}$ is calculated, $\hat{S}_{u,k}$ is determined as the reference signal, and the above-described ordering is performed. Next, by adding $B_{u,k}$ to each of the perturbation term candidates subjected to the ordering, the accuracy of the ordering when the black circle, which represents the reference signal, has an extremely different value from candidate points for the perturbation term can be improved.

Although the quadrant search is used for ordering the white circles here, the ordering may be performed using another method when the ordering is possible through simple calculation. An ordering method other than the quadrant search will be described hereinafter. A method for ranking the perturbation term candidates in the u-th stage will be described. Referring back to FIG. 4A, the perturbation term candidates $z_{u,k}$ are sequentially ranked from the white circles, which are candidate points, closest to the reference signal $S_{u,k}$ represented by the black circle. Here, assume that the candidate point $z_{u,1}$ closest to $S_{u,k}$ is represented by Expression (12).

[Math. 12]

$$z_{u,1} = -\text{round}(S_{u,k}) \quad (12)$$

Here, round(c) is a function that returns a complex number whose real part and imaginary part are integers closest to the real part and the imaginary part, respectively, of c.

Figure 4G:
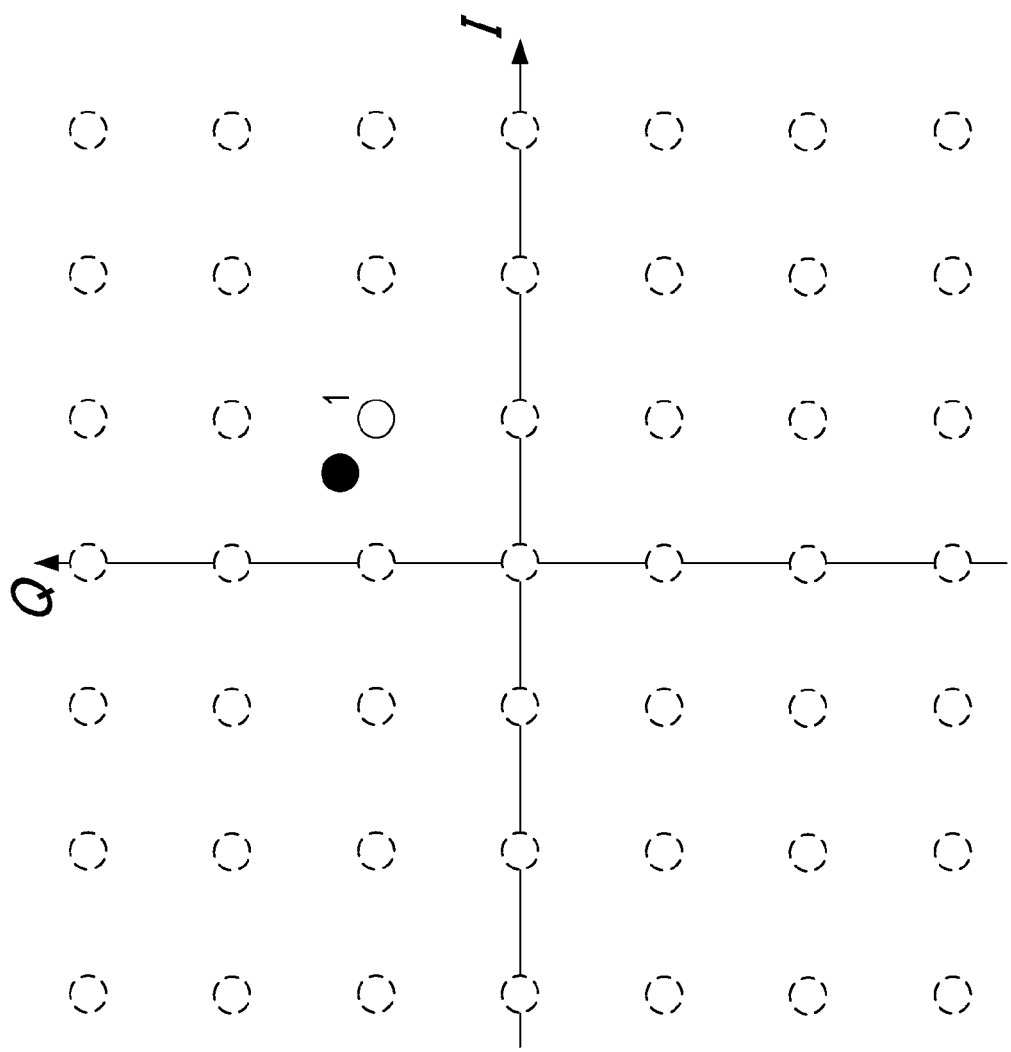
FIG. 4G is a diagram depicting a relationship between $S_{u,k}$ and $(-z_{u,1})$ in Expression (12) according to the first embodiment of the present invention in the complex plane.

FIG. 4G is a diagram depicting a relationship between $S_{u,k}$ and $(-z_{u,1})$ in Expression (12) according to the first embodiment of the present invention in the complex plane. Here, $(-z_{u,1})$ is indicated by "1". Next, assume that a Gaussian integer having a magnitude of 1 $(=(1^2+0^2)1/2)$ is added to $z_{u,1}$ that has already been selected. There are four Gaussian integers $\{1, -1, j, -j\}$ having a magnitude of 1. Four Gaussian integers obtained by adding $\{1, -1, j, -1\}$ to $z_{u,1}$ are denoted by $\{z_{u,2}$ to $z_{u,5}\}$.

Figure 4H:
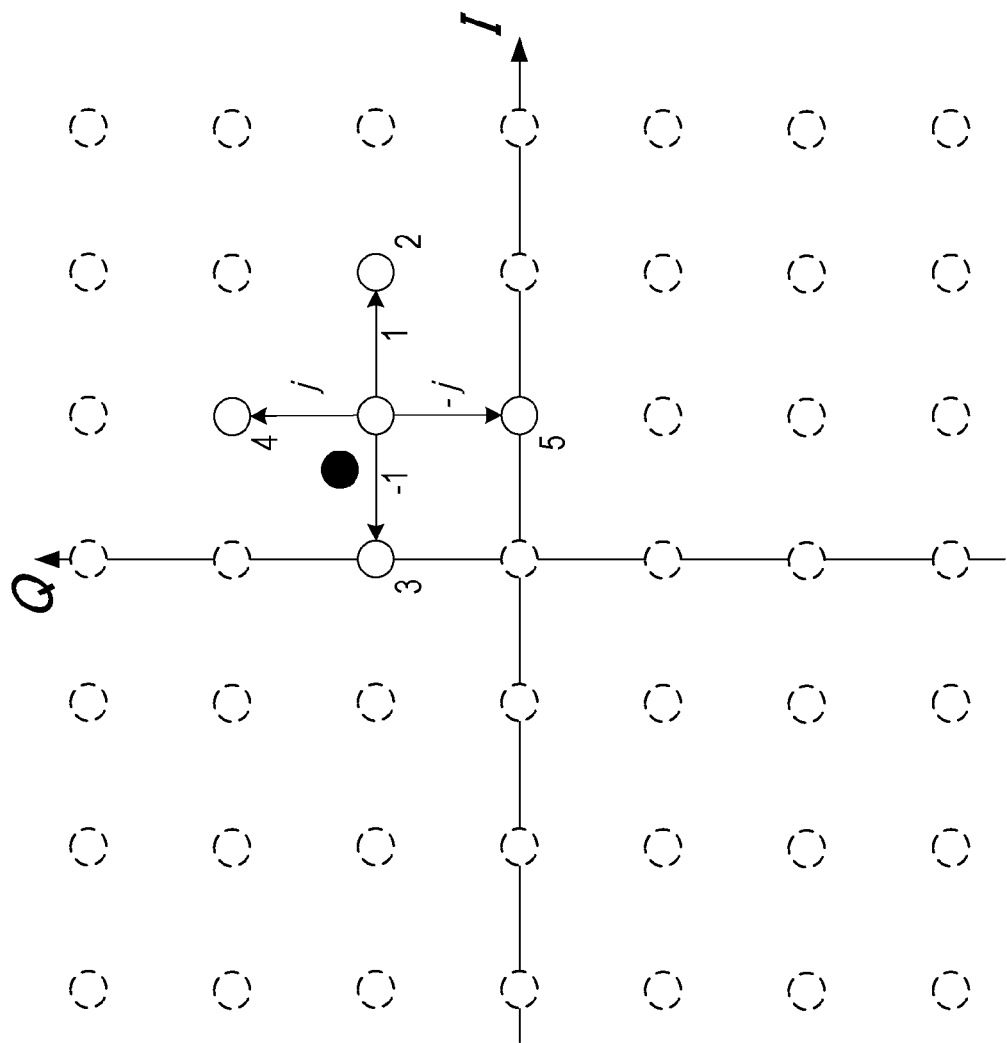
FIG. 4H is a diagram depicting relationships between $S_{u,k}$ and $\{z_{u,1}$ to $z_{u,5}\}$ according to the first embodiment of the present invention in the complex plane.

FIG. 4H is a diagram depicting relationships between $S_{u,k}$ and $\{z_{u,1}$ to $z_{u,5}\}$ according to the first embodiment of the present invention in the complex plane. Next, assume that a Gaussian integer having a magnitude of $2^{1/2}$ $(=(1^2+1^2)^{1/2})$ is added to $z_{u,1}$. There are four Gaussian integers $\{1+j, 1-j, -1+j, -1-j\}$ having a magnitude of $2^{1/2}$, and, as in the above case, four Gaussian integers obtained by adding these integers to $z_{u,1}$ are denoted by $\{z_{u,6}$ to $z_{u,9}\}$.

FIG. 4I is a diagram depicting relationships between $S_{u,k}$ and $\{z_{u,1}$ to $z_{u,9}\}$ according to the first embodiment of the present invention in the complex plane. Next, four Gaussian integers obtained by adding $\{2, -2, 2j, -2j\}$, which are Gaussian integers having a magnitude of 2 $(=(2^2+0^2)^{1/2})$, to $z_{u,1}$ are denoted by $\{z_{u,10}$ to $z_{u,13}\}$.

Figure 4J:
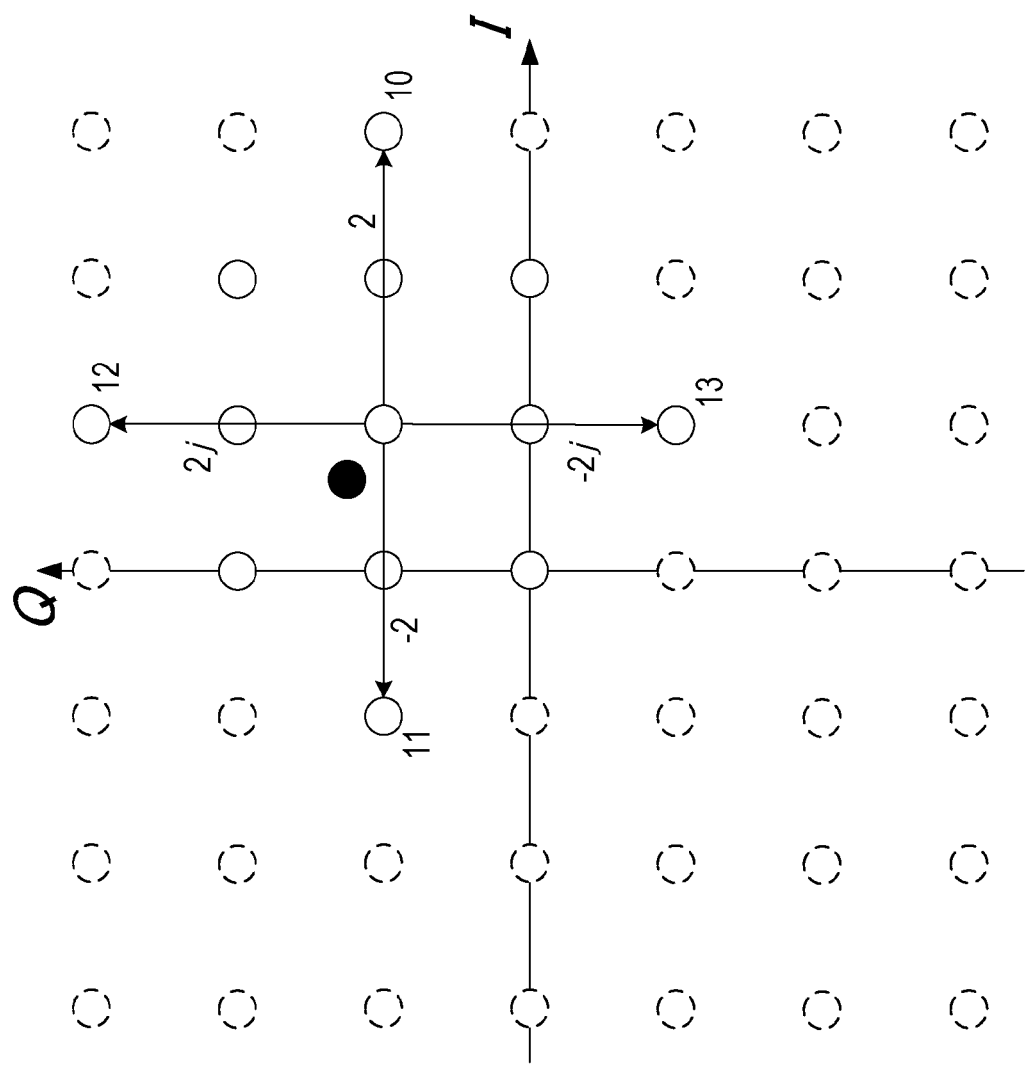
FIG. 4J is a diagram depicting relationships between $S_{u,k}$ and $\{z_{u,1}$ to $z_{u,13}\}$ according to the first embodiment of the present invention in the complex plane.

FIG. 4J is a diagram depicting relationships between $S_{u,k}$ and $\{z_{u,1}$ to $z_{u,13}\}$ according to the first embodiment of the present invention in the complex plane. Thereafter, by sequentially adding Gaussian integers to $z_{u,1}$ from those having smaller magnitudes, the candidate points can be ranked without calculating the squared Euclidean distances. It is to be noted that the ordering may be performed by preparing a list in which Gaussian integers are arranged in an ascending order in advance and adding $z_{u,1}$ to all the Gaussian integers included in the list, instead.

The above-described ranking is basically performed on the basis of a reference signal calculated in each stage. The above operation may be performed in each stage, but control may be performed such that the ordering is performed by making a table in which ordering has been performed on candidates for a perturbation vector for some values of a reference signal and referring to the table and the values of the reference signal, instead. The signal conversion section 303 outputs information associated with the ordering of perturbation terms for the terms, which is input to the perturbation vector search section 305.

Figure 5:
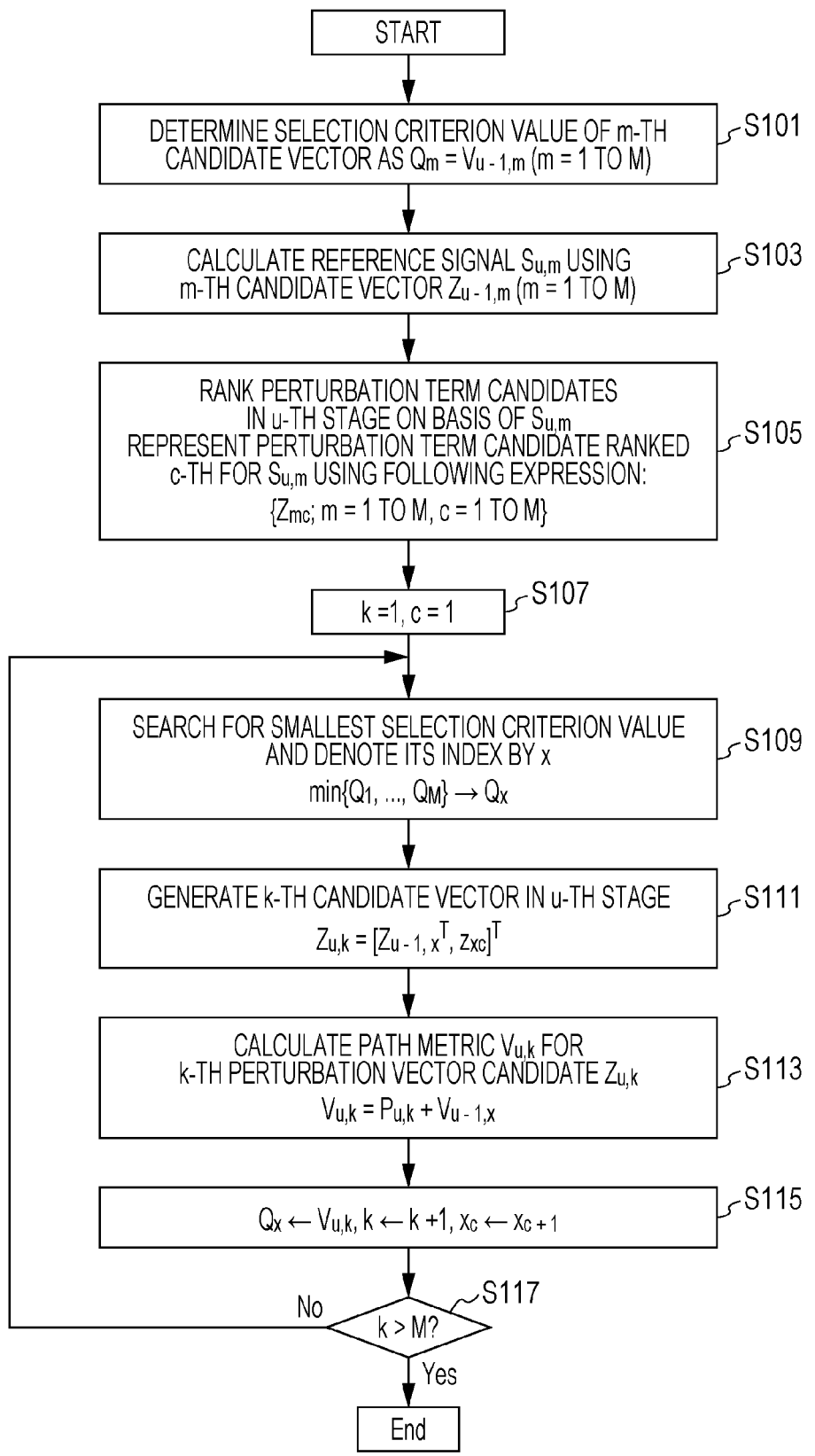
FIG. 5 is a flowchart illustrating a method for searching for perturbation term candidates in a u-th stage according to the first embodiment of the present invention.

FIG. 5 is a flowchart illustrating a method for searching for perturbation term candidates in the u-th stage according to the first embodiment of the present invention. In FIG. 5, the method for searching for perturbation term candidates in the u-th stage according to this embodiment used by the perturbation vector search section 305 as the above-described ordering method is illustrated. In the following description, assume that calculation up to the (u−1)th stage has been completed and M path metrics ($V_{u-1,1}$ to $V_{u-1,m}$) in the (u−1)th stage and M perturbation vector candidates ($Z_{u-1,1}$ to $Z_{u-1,M}$) that give these path metrics have been calculated. First, the signal conversion section 303 defines $\{Q_m; m=1$ to $M\}$ as a selection criterion value of an m-th perturbation vector candidate $Z_{u-1,m}$, and determines that $Q_m=V_{u-1,m}$ (step S101). It is to be noted that since there is no perturbation vector candidates that have been detected in the first stage, $Q_1=0$.

Next, the signal conversion section 303 calculates the reference signal $\{S_{u,m}; m=1$ to $M\}$ on the basis of the perturbation vector candidate ($Z_{u-1,1}$ to $Z_{u-1,M}$) corresponding to each selection criterion value $\{Q_m; m=1$ to $M\}$ (step S103). Next, the signal conversion section 303 performs ordering on the perturbation term candidates in the u-th stage using the above-described method on the basis of the reference signal $S_{u,m}$. A perturbation term candidate ranked c-th for the m-th reference signal $S_{u,m}$ is denoted by $\{z_{mc}; m=1 \text{ to } M, c=1 \text{ to } M\}$ (step S105).

The perturbation vector search section 305 makes initial settings of indices (k=1, c=1) (step S107). Next, the perturbation vector search section 305 searches for a smallest selection criterion value among the selection criterion values $\{Q_m; m=1 \text{ to } M\}$, and denotes its index by x (step S109). In addition, the perturbation vector search section 305 calculates k-th perturbation vector candidates $Z_{u,k}$ calculated in the u-th stage, and determines that $Z_{u,k}=[Z_{u-1,x}^T, z_{xc}]^T$ (step S111). Here, [a, b] denotes a row vector having a length $(a_0+b_0)$ obtained by coupling a row vector a having a length $a_0$ with a row vector b having a length $b_0$ in a row direction. Next, the perturbation vector search section 305 calculates the path metrics $V_{u,k}$ up to the u-th stage for the k-th perturbation vector candidates $Z_{u,k}$ calculated in the u-th stage. That is, $V_{u,k}=P_{u,k}+V_{u-1,x}$ (step S113).

Next, the perturbation vector search section 305 updates data $(Q_x \leftarrow V_{u,k}, k \leftarrow k+1, x_c \leftarrow x_{c+1})$ (step S115). When k has exceeded M (YES in step S117), the perturbation vector search section 305 ends the process. When k has not exceeded M (NO in step S117), the perturbation vector search section 305 returns to step S109.

In practice, step S101 to step S105 in the above signal processing are performed by the signal conversion section 303, but the process is collectively described here for convenience of description. It is to be noted that a configuration may be used in which the perturbation vector search section 305 performs the entirety of the signal processing without separately including the signal conversion section 303, instead. Perturbation term candidates in a certain stage are input to the signal conversion section 303 again, and the signal processing in the signal conversion section 303 is performed again. After the above processing is performed from the first stage to the U-th stage, a candidate vector whose path metrics are the smallest is determined as an optimal perturbation vector Z.

It is to be noted that the transmission performance in this embodiment largely depends on the number of survivors M. Whereas the transmission performance improves in proportion to the value of M, the amount of operation also increases. Therefore, it is desirable to use as small a value of M as possible to satisfy the required transmission quality. A relationship between the transmission quality and M can be obtained by performing bit error rate (BER) measurement using computer simulation or the like in advance, but normally the relationship largely depends on the number of spatial multiplex terminals U and the spatial correlation value between the channels of the transmission antennas. Therefore, the precoding unit 109 may perform control such that a table of the optimal number of survivors M according to the number of spatial multiplex terminals U is made in advance and the number of survivors M is determined in accordance with the table. In general, as the spatial multiplex number increases, a larger value of M is required. In addition, in an environment in which the spatial correlation value significantly varies over time, a terminal apparatus that will be described later may transmit the spatial correlation value observed thereby to the base station apparatus, and the number of survivors may be adaptively controlled on the basis of the transmitted spatial correlation value. For example, control may be performed such that when the spatial correlation value is small, the number of survivors included in the above table is used, and when the spatial correlation value is large, a value larger than the number of survivors included in the table is used. How large the number of survivors should be relative to the spatial correlation value may be examined through computer simulation or the like in advance and an optimal value may be determined.

In addition, as can be seen from Expression (3), the VP can be regarded as a precoding method in which control is performed such that the required transmission power becomes smallest in a given transmission scheme (in this embodiment, a transmission scheme in which the IUI becomes 0). However, this means that the reception quality significantly changes depending on the states of the channels, and a problem might be caused when adaptive modulation transmission, in which an optimal modulation scheme and coding rate are used in accordance with the reception quality, is applied. Therefore, the minimization problem represented by Expression (3) may be transformed such that a perturbation term with which an arbitrary reception quality is obtained is searched for, or more simply, control may be performed such that an arbitrary reception quality is achieved by adding an arbitrary perturbation term to a perturbation vector that minimizes the required transmission power. Here, it is desirable to associate the arbitrary reception quality with a Modulation and Coding Scheme (MCS) set, in which the reception quality, the modulation scheme, and the cording rate used in the adaptive modulation transmission are associated with one another.

Referring back to FIG. 3, the perturbation vector search section 305 outputs the perturbation vector using the above-described method, and the perturbation vector is input to the transmission signal generation section 307. The transmission signal generation section 307 generates a transmission signal vector s on the basis of the input information and Expression (2), and outputs the transmission signal vector s as an output of the precoding unit 109. Next, a case in which the reference signals (the CRS and the DM-RS) have been input to the precoding unit 109 will be described. The CRS is not subjected to signal processing relating to the precoding, and is directly output. The DM-RS is subjected to the same precoding as for the transmission data, but the perturbation vector is not added.

[1.3 Terminal Apparatus]

Figure 6:
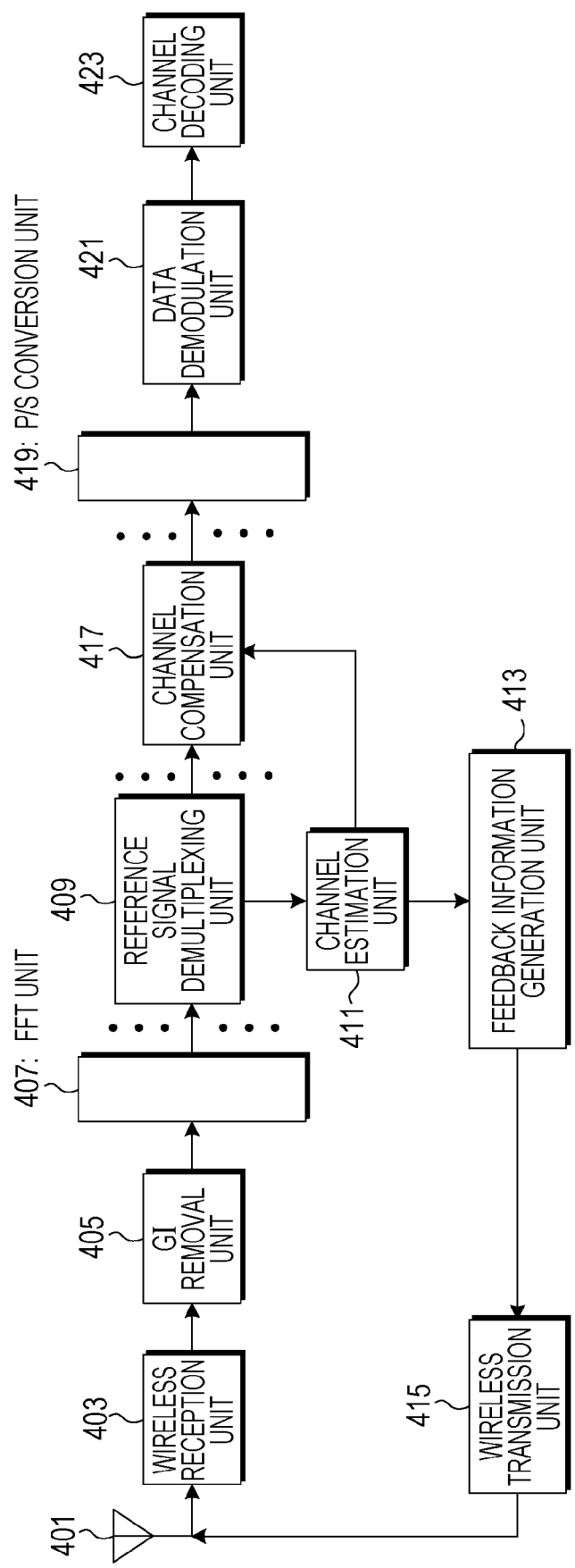
FIG. 6 is a block diagram illustrating the configuration of a terminal apparatus according to the first embodiment of the present invention.

FIG. 6 is a block diagram illustrating the configuration of the terminal apparatus according to the first embodiment of the present invention. As illustrated in FIG. 6, the terminal apparatus is configured by including an antenna 401, a wireless reception unit 403, a GI removal unit 405, an FFT unit 407, a reference signal demultiplexing unit 409, a channel estimation unit 411, a feedback information generation unit 413, a wireless transmission unit 415, a channel compensation unit 417, a P/S conversion unit 419, a data demodulation unit 421, and a channel decoding unit 423. Signal processing in the u-th terminal apparatus will be described hereinafter.

In the terminal apparatus, a signal received by the antenna 401 is input to the wireless reception unit 403 and converted into a baseband signal. The signal converted into the baseband signal is input to the GI removal unit 405 and after the guard intervals are removed, input to the FFT unit 407. The FFT unit 407 applies an $N_c$-point fast Fourier transform (FFT) or discrete Fourier transform (DFT) to the input signal to convert the input signal into $N_c$ subcarrier components. An output of the FFT unit 407 is input to the reference signal demultiplexing unit 409. The reference signal demultiplexing unit 409 demultiplexes the input signal into a data signal component, a CRS component, and a DM-RS component. The reference signal demultiplexing unit 409 then outputs the data signal component to the channel compensation unit 417 and the CRS and the DM-RS to the channel estimation unit 411.

In the channel estimation unit 411, channel estimation is performed on the basis of the input CRS and DM-RS, which are known reference signals. The known reference signal sequences for the terminal apparatuses are transmitted from the base station apparatus in such a way as to be orthogonal to one another. First, channel estimation using the CRS will be described. Since the CRS is transmitted with no precoding applied, a component (for example, a u-th row component of H(k) in the case of the u-th terminal apparatus) corresponding to each terminal apparatus in the channel matrix H(k) represented by Expression (1) can be estimated. When the CRS has been multiplexed while being thinned out for a wireless resource, not all channel information regarding the subcarriers can be estimated, but all the channel information regarding the subcarriers can be estimated through appropriate interpolation by appropriately multiplexing the CRS in a time direction and a frequency direction such that a sampling theorem is satisfied. A specific method for estimating a channel is not particularly limited, but, for example, it is possible to use two-dimensional MMSE channel estimation.

The channel information estimated on the basis of the CRS is input to the feedback information generation unit 413. The feedback information generation unit 413 generates information to be fed back to the base station apparatus in accordance with the format of the channel information to be fed back by each terminal apparatus. In the present invention, the format of channel information is not limited to a particular format. For example, a method may be used in which the estimated channel information is quantized using a finite number of bits and the quantized information is fed back. The information generated by the feedback information generation unit 413 is input to the wireless transmission unit 415 and transmitted to the base station apparatus. It is to be noted that in this embodiment it is assumed that the channel matrix given by Expression (1) is fed back such that the base station apparatus can detect the channel matrix, but control may be performed such that a correlation matrix of a channel matrix estimated by each terminal apparatus is fed back, instead. Alternatively, control may be performed such that, in addition to the channel information, control information (for example, a channel quality indicator (CQI) in LTE) associated with the reception quality and control information (for example, a spatial correlation coefficient between the transmission antennas) associated with the spatial correlation between the channels of the transmission antennas are also transmitted. In this case, the transmitted information can be used by the precoding unit 109 to determine the number of survivors M.

Next, channel estimation using the DM-RS will be described. Unlike the CRS, the DM-RS is subjected to part of the precoding and transmitted, and therefore channel information can be obtained using the DM-RS in order to demodulate a precoded data signal. More specifically, in the case of the u-th terminal apparatus, a component in a u-th row and a u-th column of a matrix β(k)H(k)W(k) obtained by multiplying the channel matrix H(k) by a linear filter W(k) and a power normalization coefficient β(k) can be estimated. It is to be noted that, as with the CRS, the DM-RS can be thinned out and multiplexed in wireless resources but information for demodulation can be obtained for all the subcarrier components by performing appropriate interpolation. It is to be noted that the information obtained using the DM-RS is input to the channel compensation unit 417.

The data signal component in the outputs of the reference signal demultiplexing unit 409 and the channel information obtained using the DM-RS in an output of the channel estimation unit 411 are input to the channel compensation unit 417. The channel compensation unit 417 performs a channel equalization process on the data signal component. The data signal component $\{R_u(k); k=1$ to $N_c$ (however, the reference signal component is excluded)$\}$ is given by Expression (13).

[Math. 13]

$$\begin{cases} R_u(k) = \hat{H}_u(k)(d_u + 2\delta z_u) + G_u(k) + N_u(k) \\ \hat{H}_u(k) = \beta(k)h_u(k)w_u(k) \\ G_u(k) = \sum_{i=1(i \neq u)}^{U} h_u(k)w_i(k)(d_i + 2\delta z_i) \end{cases} \quad (13)$$

Here, $h_u(k)$ denotes the u-th row component of H(k), and $w_u(k)$ denotes the u-th column component of W(k). $G_u(k)$ denotes residual IUI. For example, the residual IUI becomes 0 when the linear filter is based on the ZF criterion. $N_u(k)$ denotes noise. In the following description, $G_u(k)$ and $N_u(k)$ are omitted to simplify the description.

First, the channel compensation unit 417 divides $R_u(k)$ by equivalent channel gain $\hat{H}_u(k)$. That is, $R_u(k)/\hat{H}_u(k)=(d_u+2\delta z_u)$. The equivalent channel gain $\hat{H}_u(k)$ is information estimated by the channel estimation unit 411 using the DM-RS and input to the channel compensation unit 417 by the channel estimation unit 411. Thereafter, a modulo operation with a modulo width of 2δ represented by Expression (14) is performed on $\{R_u(k)/\hat{H}_u(k)\}$, and a soft-decision value sequence $\{S_u(k)\}$ is output.

[Math. 14]

$$S_u(k) = d_u(k) + 2\delta z_u(k) - \qquad (14)$$
$$2\delta \cdot \text{floor}\left(\frac{d_u(k) + 2\delta z_u(k)}{2\delta} + \frac{1}{2}(1+j)\right)$$
$$= d_u(k) + 2\delta z_u(k) + 2\delta z_{r,u}(k)$$
$$z_{r,u}(k) = -\text{floor}\left(\frac{d_u(k) + 2\delta z_u(k)}{2\delta} + \frac{1}{2}(1+j)\right)$$

Because the modulo operation changes the values of the real part and the imaginary part of an output by a value larger than −δ but smaller than δ relative to an input, $z_u(k)+z_{r,u}(k)\approx 0$ when the residual IUI and the power of noise are sufficiently small, and therefore the effect of the perturbation term can be eliminated.

An output of the channel compensation unit 417 is then input to the P/S conversion unit 419 and subjected to parallel-to-serial conversion. An output of the P/S conversion unit 419 is then input to the data demodulation unit 421 and the channel decoding unit 423 and subjected to data modulation and channel decoding. It is to be noted that, depending on a method for calculating a log likelihood ratio (LLR) used by the channel decoding unit 423, the modulo operation performed by the channel compensation unit 417 need not be performed.

Although OFDM signal transmission is assumed and it is assumed that the precoding is performed for each subcarrier in this embodiment, the transmission scheme (or the access scheme) and the units in which the precoding is applied are not limited. For example, this embodiment may be applied when precoding is performed for each resource block including a plurality of subcarriers, and, similarly, may also be applied to a single-carrier-based access scheme (for example, a single-carrier frequency-division multiple access (SC-FDMA) scheme or the like).

According to the above-described method, a significant reduction in the amount of operation can be realized while keeping reduction of the transmission performance to the minimum in downlink MU-MIMO transmission that uses the VP. Even if the number of multiplex terminal apparatuses increases, an increase in the amount of operation is not exponential but polynomial, and accordingly a significantly increase in the number of multiplex terminal apparatuses can be realized, thereby contributing to improvement of spectral efficiency.

2. Second Embodiment

In the first embodiment, a method for searching for a perturbation vector that realizes a reduction in the amount of operation in the VP has been disclosed. The transmission performance in the first embodiment largely depends on the number of survivors M of perturbation term candidates in each stage. The value of M may be increased in order to obtain desirable transmission performance, but the amount of operation undesirably increases in proportion to the value of M. In a second embodiment, a method by which the value of M can be decreased without reducing the transmission performance will be disclosed. The configuration of the base station apparatus, the configuration of the antenna unit 111, and the configuration of the terminal apparatuses are the same as those according to the first embodiment, and the configuration of the precoding units 501 and signal processing performed by the precoding units 501 are different. Only the configuration of the precoding units 501 and the signal processing performed by the precoding units 501 according to the second embodiment will be described hereinafter.

[2.1 Precoding Devices]

Figure 7:
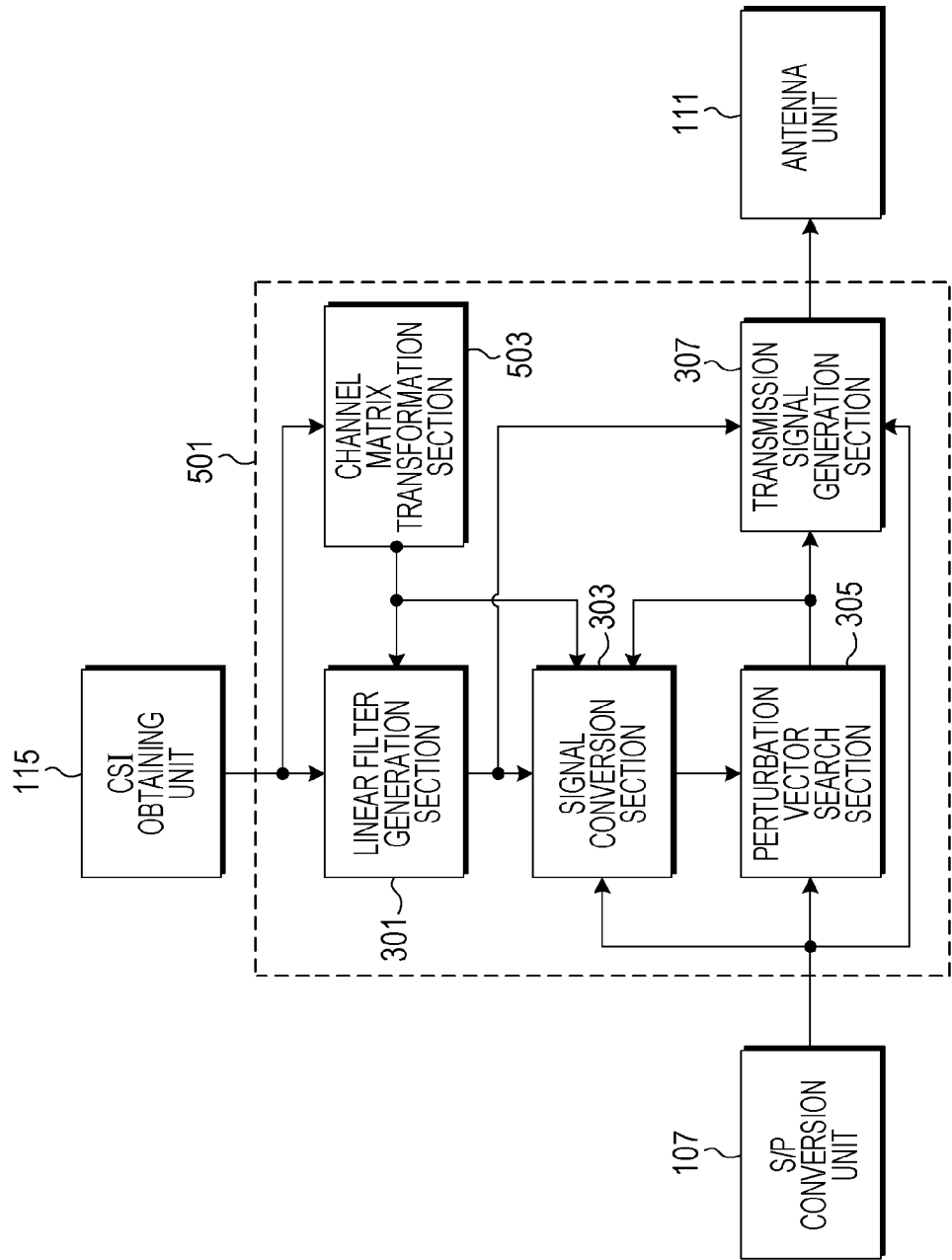
FIG. 7 is a block diagram illustrating the device configuration of a precoding unit 501 according to a second embodiment of the present invention.

FIG. 7 is a block diagram illustrating the device configuration of each precoding unit 501 according to the second embodiment of the present invention. As illustrated in FIG. 7, the precoding unit 501 is configured by including the linear filter generation section 301, the signal conversion section 303, the perturbation vector search section 305, the transmission signal generation section 307, and a channel matrix transformation section 503. The k-th subcarrier component $\{d_u(k); u=1 \text{ to } U\}$ of the output of the S/P conversion unit 107, which relates to the transmission data for each terminal apparatus, and the channel matrix H(k) of the k-th subcarrier of the output of the CSI obtaining unit 115 are input to the precoding unit 501. H(k) is estimated by the terminal apparatus on the basis of the above-described CRS and transmitted to the base station apparatus. In the following description, it is assumed that H(k) is ideally obtained by the CSI obtaining unit 115, and the index k is omitted in order to simplify the description.

In the precoding unit 501, first, the channel matrix transformation section 503 performs a process for transforming a matrix on the channel matrix H input from the CSI obtaining unit 115. The process for transforming a matrix is performed to decrease the number of survivors M in the search for a perturbation vector.

A formula to be minimized in the VP is given by Expression (5), and as noted in the description of the signal processing performed by the precoding unit 109, candidates for the perturbation terms are listed from those for $z_1$. Here, since the candidates for $z_1$ are used in the calculation of metrics in all the subsequent stages, the effect of the candidates for $z_1$ upon the overall transmission power is large. Therefore, it is important to select a candidate having highest possible reliability.

For this purpose, a component $L_{1,1}$ in a first row and a first column of the lower triangular matrix L in Expression (5) is desirably as large as possible. As a method for increasing $L_{1,1}$, ordering of the channel matrix H may be used.

The ordering refers to switching of the rows of the channel matrix, and can generally be realized through multiplication using a permutation matrix Π. That is, the channel matrix transformation section 503 performs signal processing in which a matrix ΠH obtained by multiplying the input channel matrix H by the permutation matrix Π is output as a new channel matrix H. With respect to an appropriate method for calculating the permutation matrix Π, because there are a total of U! selectable permutation matrices when the channel matrix H is a matrix of U rows by $N_t$ columns, a method in which the largest $L_{1,1}$ is obtained by calculating a Cholesky decomposition matrix L of the matrix ΠH is calculated for each of the permutation matrices may be selected. With this method, however, the amount of operation is extremely large, and therefore the permutation matrix may be obtained using a BLAST method or a method based on sorted QR decomposition.

After an appropriate permutation matrix Π is calculated, ΠH may be determined as a channel matrix and Πd obtained by multiplying a transmission symbol vector d by Π as a new transmission symbol vector, and signal processing may be performed by another component. The signal processing performed by a component other than the channel matrix transformation section 503 is exactly the same as that performed by the precoding unit 109 except that the channel matrix H and the transmission symbol vector d are updated in the above-described manner, and accordingly description thereof is omitted.

As the method for transforming a matrix, not the ordering but a lattice basis reduction technique may be used. The lattice basis reduction technique is a matrix transformation technique for obtaining a matrix having higher orthogonality by multiplying a given matrix H by a unimodular matrix T. When the orthogonality of a matrix is high, the diagonal component of a triangular matrix is large compared to when the orthogonality of a matrix is low, and as a result, it is possible to increase the value of the component in the first row and the first column. The unimodular matrix is a matrix whose components are all Gaussian integers and whose determinant is 1 or −1. An appropriate method for calculating a unimodular matrix is not limited to a particular method, but a method based on a well-known LLL algorithm may be used. In the following description, a linear filter based on the ZF criterion (that is, $W=H^{-1}$) is used as a linear filter.

First, the channel matrix transformation section 503 applies the LLL algorithm to an inverse matrix $H^{-1}$ of the channel matrix H to calculate an inverse matrix $G^{-1}$ having higher orthogonality. Here, an output of the LLL algorithm is $G^{-1}=H^{-1}T$, and therefore $G=T^{-1}H$. Here, since $T^{-1}$ is a unimodular matrix, $T^{-1}$ is replaced by T in the expression (that is, G=TH). As a result, the channel matrix transformation section 503 outputs TH as a new channel matrix, and another component performs signal processing while determining TH as a channel matrix. On the other hand, with respect to the transmission signal vector d, Td obtained by multiplying the transmission signal vector d by T is determined as a new transmission signal vector, but Td subjected to a modulo operation with a modulo width of 2δ is also determined as a transmission signal vector. When the lattice basis reduction technique is used, signal processing performed by a component other than the channel matrix transformation section 503 is exactly the same as that performed by the precoding unit 109 except that the channel matrix H and the transmission symbol vector d are updated in the above-described manner, and accordingly description thereof is omitted.

It is to be noted that the permutation matrix calculated when the above-described ordering has been applied is a type of unimodular matrix. Therefore, the channel matrix transformation section 503 may perform a matrix transformation using an arbitrary unimodular matrix, instead. For example, control may be performed such that a plurality of unimodular matrices are stored in a codebook or the like and one of the unimodular matrices that can increase the orthogonality of the channel the most is used. In addition, when the reliability of the perturbation term candidates in the first stage is not improved even by the above-described method, the number of survivors in the stages in a first half including the first stage may be larger than the number of survivors in the stages in a second half.

By performing the above-described precoding, the number of survivors M can be smaller than when the method according to the first embodiment is used, and accordingly the amount of operation can be further reduced.

3. Third Embodiment

In the second embodiment, precoding in which the channel matrix is subjected to a matrix transformation in advance in order to further reduce the amount of operation in the VP has been described. Although the amount of operation in the ordering and the lattice basis reduction technique described in the second embodiment is smaller than in the search for a perturbation vector in the VP, the amount becomes too large to be neglected as the number of terminal multiplexed becomes large. In a third embodiment, a method for reducing the amount of operation relating to a matrix transformation by focusing upon correlation between channel matrices of wireless resources will be described. The configuration of the base station apparatus, the configuration of the antenna unit 111, and the configuration of the terminal apparatuses are the same as those according to the first embodiment, and the configuration of precoding units 601 and signal processing performed by the precoding units 601 are different. In the following description, only the configuration of the precoding units 601 and the signal processing performed by the precoding units 601 according to the third embodiment will be described.

[3.1 Precoding Devices]

Figure 8:
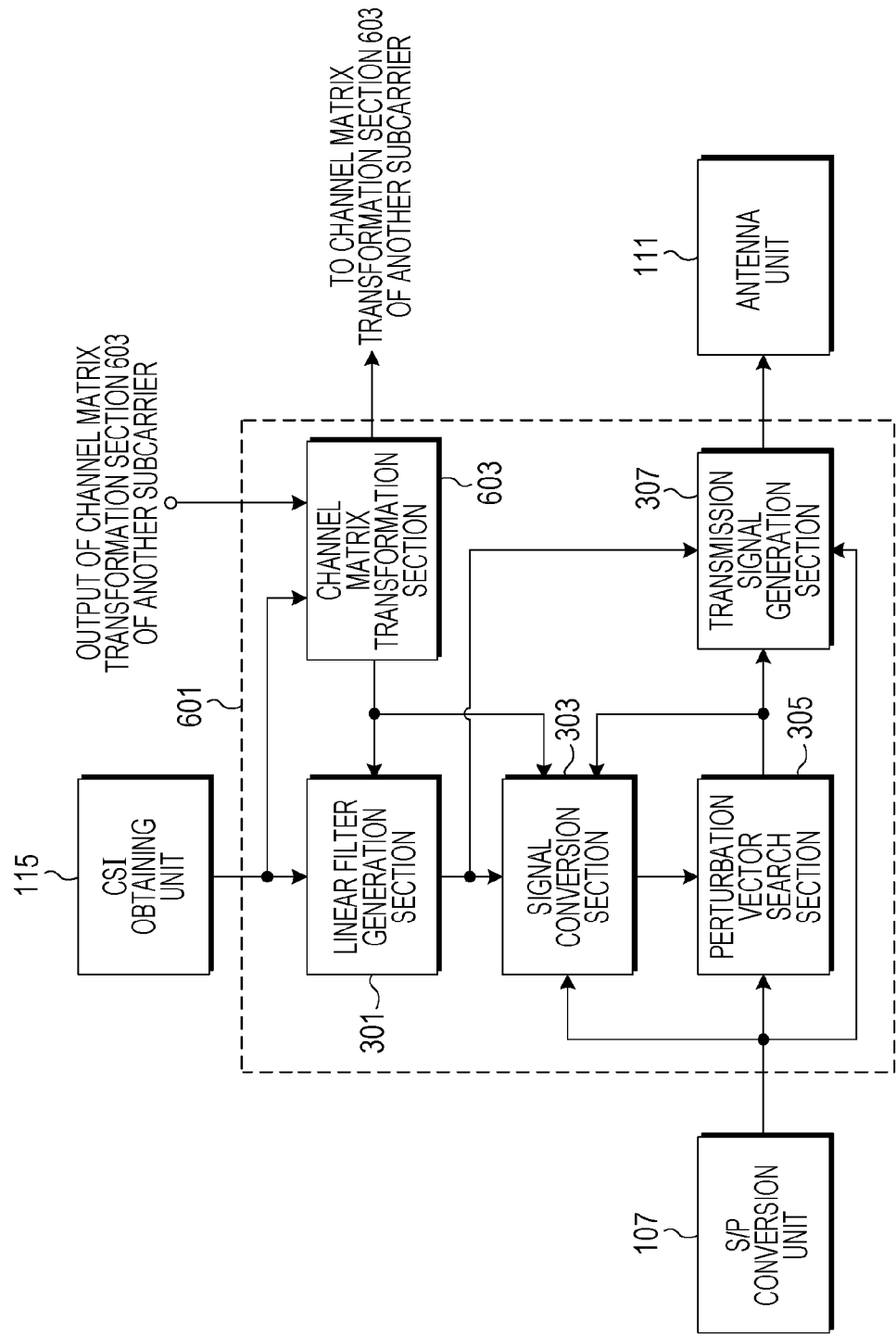
FIG. 8 is a block diagram illustrating the device configuration of a precoding unit 601 according to a third embodiment of the present invention.

FIG. 8 is a block diagram illustrating the device configuration of the precoding unit 601 according to the third embodiment of each present invention. As illustrated in FIG. 8, the precoding unit 601 includes the linear filter generation section 301, the signal conversion section 303, the perturbation vector search section 305, the transmission signal generation section 307, and a channel matrix transformation section 603. The device configuration is the same as that of the precoding unit 501, but an output of the channel matrix transformation section 603 of the precoding unit 601 of another subcarrier is input to the precoding unit 601 in addition to the k-th subcarrier component $\{d_u(k); u=1 \text{ to } U\}$ of the output of the S/P conversion unit 107 and the channel matrix H(k) of the k-th subcarrier of the output of the CSI obtaining unit 115. H(k) is estimated by each terminal apparatus on the basis of the above-described CRS and transmitted to the base station apparatus. In general wireless communication channels, channels have correlation between wireless resources. For example, in the case of OFDM transmission described in this embodiment, the channel matrix H(k) of the k-th subcarrier and the channel matrix H(k+1) of the (k+1)th subcarrier have a strong correlation when the frequency selectivity of the channels is low. This is focused upon in the third embodiment.

In the channel matrix transformation section 603, as in the signal processing performed by the channel matrix transformation section 603 of the precoding unit 501, a matrix transformation such as ordering is performed on the channel matrix H, but at this time, the matrix transformation is performed on the basis of the same transformation matrix for a certain number of subcarriers in accordance with the frequency selectivity of the channels. For example, when the frequency selectivity of the channels is low, only the unimodular matrix T of the channel matrix of the seventh subcarrier is calculated for the first to twelfth subcarriers, and the unimodular matrix may always be used for the first to twelfth subcarriers. Alternatively, control may be performed such that the amount of operation relating to calculation of a unimodular matrix is reduced not by simply using the unimodular matrix but by calculating a unimodular matrix for a certain subcarrier on the basis of a channel matrix subjected to conversion using a unimodular matrix calculated for an adjacent subcarrier.

The channels have correlation not only between subcarriers but also in the time direction, that is, between OFDM signals, when the moving speeds of the terminal apparatuses are low. For example, when a transformation matrix of the channel matrix of the k-th subcarrier is obtained, a unimodular matrix may be calculated only for a first OFDM signal, which is a leading signal, among seven contiguous OFDM signals and the unimodular matrix may be used by the precoding unit 601 for the k-th subcarriers of the subsequent OFDM signals. Alternatively, only one unimodular matrix may be calculated and used for twelve contiguous subcarriers of seven contiguous OFDM signals, that is, a total of eighty-four subcarriers.

In addition, in the present invention, basically frequency-division duplexing (FDD) in which the carrier frequency is different between an uplink and a downlink is described, but in time-division duplexing (TDD) in which the same carrier frequency is used between the uplink and the downlink, MU-MIMO using the VP based on the present invention may be applied. In this case, if the terminal apparatuses simultaneously connected using downlink MU-MIMO, which is described in the present invention, also perform simultaneous communication in the uplink, the uplink transmission uses a transmission scheme called uplink MU-MIMO. In the uplink MU-MIMO, signals transmitted from the terminal apparatuses are received by the base station apparatus in a state in which the signals are spatially multiplexed, and accordingly the same spatial demultiplexing process as MIMO-SDM needs to be performed. A V-BLAST method and an MLD method are widely known as the spatial demultiplexing processes, but spatial demultiplexing accuracy can be improved by performing the ordering or the lattice basis reduction on a channel matrix estimated in advance. Since the channels of the uplink and the downlink have a strong correlation in the TDD, a permutation matrix or a unimodular matrix used in the spatial demultiplexing process may be input to the channel matrix transformation section 603 of the precoding unit 601 and a channel matrix transformation may be performed on the basis of this information, or information may be shared and used for the precoding or the spatial demultiplexing.

In addition, the instantaneous gain of the channels has substantially no correlation between the uplink and the downlink in the FDD, but some statistical properties (for example, covariance matrices of the channel matrices) of the channels can have a strong correlation between the uplink and the downlink. In this embodiment, the precoding is basically performed on the basis of the channel matrix H(k), that is, the instantaneous channel gain, but when the precoding is performed on the basis of the statistical properties of the channels such as the covariance matrices, the matrix transformation or the like may be performed on the basis of a covariance matrix calculated from a received signal of the uplink, or the precoding itself may be performed on the basis of a covariance matrix calculated from a received signal of the uplink.

In the third embodiment, a case in which the transformation matrix that transforms the channel matrix is shared between the wireless resources has been described. Because the number of times that a transformation matrix should be calculated can be reduced in accordance with the states of the channels, the amount of operation can be further reduced.

For All Embodiments

[Modifications]

Although the embodiments of the present invention have been described in detail with reference to the drawings, the specific configuration is not limited to the embodiments, and designs that do not deviate from the scope of the present invention are also included in the claims.

Programs that operate on a mobile station apparatus and a base station apparatus relating to the present invention are programs (programs for causing a computer to function) for controlling a CPU or the like such that the functions of the above embodiments relating to the present invention are realized. In addition, information handled by these apparatuses is temporarily accumulated in a RAM during processing, and then stored in various ROMs and HDDs and read, corrected, or written by the CPU as necessary. As a recording medium that stores the programs, any of a semiconductor medium (for example, a ROM, a nonvolatile memory card, or the like), an optical recording medium (for example, a DVD, an MO, an MD, a CD, a BD, or the like), a magnetic recording medium (for example, a magnetic tape, a flexible disk, or the like), and the like may be used. In addition, the functions of the above-described embodiments can be realized not only by executing loaded programs but also by performing processing along with an operating system, another application program, or the like on the basis of an instruction from the program.

In addition, when the programs are to be distributed to the market, the programs may be stored in portable recording media and distributed, or the programs may be transferred to server computers connected through a network such as the Internet. In this case, storage apparatuses of the server computers are also included in the present invention. In addition, part or the entirety of the mobile station apparatus and the base station apparatus in the above-described embodiments may be realized as LSI, which is typically an integrated circuit. Each function block of the mobile station apparatus and the base station apparatus may be individually realized as a processor, or part or all of the function blocks may be integrated and realized as a processor. Alternatively, in a method for realizing the functional blocks as an integrated circuit, not the LSI but a dedicated circuit or a general-purpose processor may be used. In addition, if a technology for realizing the functional blocks as an integrated circuit that replaces the LSI is developed as a result of the evolution of semiconductor technologies, an integrated circuit realized by the technology may be used.

REFERENCE SIGNS LIST 101 channel coding unit
103 data modulation unit
105 reference signal multiplexing unit
107 S/P conversion unit
109 precoding unit
111 antenna unit
113 control information obtaining unit
115 CSI obtaining unit
201 IFFT section
203 GI insertion section
205 wireless transmission section
207 wireless reception section
209 antenna
301 linear filter generation section
303 signal conversion section
305 perturbation vector search section
307 transmission signal generation section
401 antenna
403 wireless reception unit
405 GI removal unit
407 FFT unit
409 reference signal demultiplexing unit
411 channel estimation unit
413 feedback information generation unit
415 wireless transmission unit
417 channel compensation unit
419 P/S conversion unit
421 data demodulation unit
423 channel decoding unit
501 precoding unit
503 channel matrix transformation section
601 precoding unit
603 channel matrix transformation section

The invention claimed is:

1. A precoding apparatus that performs a preliminary process on transmission data transmitted from a wireless transmission apparatus including a plurality of antennas to at least one wireless reception apparatus, the precoding apparatus comprising:

linear filter generation circuitry configured to generate a linear filter on the basis of channel information between each antenna and the wireless reception apparatus;

signal conversion circuitry configured to expand perturbation term candidates of a perturbation vector to be added to a transmission data vector and a reference signal associated with the transmission data in a complex plane; and perturbation vector search circuitry configured to search for the perturbation vector to be added to the transmission data vector on the basis of the perturbation term candidates and the reference signal expanded in the complex plane, wherein a transmission signal vector is calculated by adding a found perturbation vector to the transmission data vector and multiplying the transmission data vector by the linear filter.

2. The precoding apparatus according to claim 1, wherein the perturbation vector includes a perturbation term, which is a complex number obtained by multiplying an arbitrary Gaussian integer by a real number associated with a method for modulating data applied to the transmission data, as an element.

3. The precoding apparatus according to claim 1, wherein the reference signal is calculated on the basis of perturbation term candidates of a perturbation vector associated with another reference signal.

4. The precoding apparatus according to claim 1, further comprising:

channel matrix transformation circuitry configured to transform a channel matrix indicating the channel information into a matrix that is suitable for any of matrix operations performed on the linear filter including QR decomposition, QL decomposition, and Cholesky decomposition, wherein the signal transformation circuitry is configured to executes a matrix operation corresponding to the transformed channel matrix on the linear filter using the transformed channel matrix.

5. The precoding apparatus according to claim 4, wherein the channel matrix transformation circuitry is configured to multiply the channel matrix by a unimodular matrix calculated on the basis of a lattice basis reduction technique or an ordering technique.

6. The precoding apparatus according to claim 5, wherein, in a case where wireless resources have a high correlation, the channel matrix transformation circuitry is configured to transforms the channel matrix while sharing part of information included in the unimodular matrix.

7. The precoding apparatus according to claim 1, wherein the perturbation vector search circuitry is configured to divides the complex plane into a plurality of divisions, identifies a division including the reference signal, selects perturbation term candidates included in the identified division as candidates for a perturbation term to be added to the transmission data, and searches for the perturbation vector to be added to the transmission data vector.

8. The precoding apparatus according to claim 1, wherein the perturbation vector search circuitry configured to detects a Gaussian integer closest to the reference signal, adds the detected Gaussian integer to a Gaussian integer string arranged in an ascending order of value, selects the Gaussian integer string to which the detected Gaussian integer has been added as candidates for a perturbation term to be added to the transmission data, and searches for the perturbation vector to be added to the transmission data vector on the basis of the selected candidates for the perturbation term.

9. The precoding apparatus according to claim 1, wherein the wireless reception apparatus transmits, to the wireless transmission apparatus, information associated with spatial correlation between channels between the wireless reception apparatus and the wireless transmission apparatus, and a number of candidates for a perturbation term to be added to the transmission data is determined on the basis of the information associated with the spatial correlation.

10. The precoding apparatus according to claim 1, wherein the perturbation vector search circuitry is configured to determines priority ranking of the perturbation vector.

11. The precoding apparatus according to claim 1, wherein the perturbation vector search circuitry is configured to search for a perturbation vector with which required transmission power becomes lowest.

12. The precoding apparatus according to claim 11, wherein the required transmission power is calculated on the basis of transmission power calculated for a perturbation vector associated with another reference signal.

13. A precoding method for performing a preliminary process on transmission data transmitted from a wireless transmission apparatus including a plurality of antennas to at least one wireless reception apparatus, the method comprising the steps of:

generating a linear filter on the basis of channel information between each antenna and the wireless reception apparatus;

expanding perturbation term candidates of a perturbation vector to be added to a transmission data vector and a reference signal associated with the transmission data in a complex plane;

searching for the perturbation vector to be added to the transmission data vector on the basis of the perturbation term candidates and the reference signal expanded in the complex plane; and calculating a transmission signal vector by adding a found perturbation vector to the transmission data vector and multiplying the transmission data vector by the linear filter.

14. An integrated circuit that is mounted on a wireless transmission apparatus including a plurality of antennas and that causes the wireless transmission apparatus to realize a precoding function for performing a preliminary process on transmission data transmitted to at least one wireless reception apparatus, the precoding function comprising:

circuitry configured to generate a linear filter on the basis of channel information between each antenna and the wireless reception apparatus;

circuitry configured to expand perturbation term candidates of a perturbation vector to be added to a transmission data vector and a reference signal associated with the transmission data in a complex plane;

circuitry configured to search for the perturbation vector to be added to the transmission data vector on the basis of the perturbation term candidates and the reference signal expanded in the complex plane; and circuitry configured to calculate a transmission signal vector by adding a found perturbation vector to the transmission data vector and multiplying the transmission data vector by the linear filter.

* * * * *